United States Patent
Zhang et al.

(10) Patent No.: US 9,971,845 B2
(45) Date of Patent: May 15, 2018

(54) FILE MANAGEMENT METHOD AND DEVICE

(71) Applicant: BEIJING QIHOO TECHNOLOGY COMPANY LIMITED, Beijing (CN)

(72) Inventors: Yi Zhang, Beijing (CN); Huan Ren, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 210 days.

(21) Appl. No.: 14/442,940

(22) PCT Filed: Sep. 18, 2013

(86) PCT No.: PCT/CN2013/083726
§ 371 (c)(1),
(2) Date: May 14, 2015

(87) PCT Pub. No.: WO2014/075510
PCT Pub. Date: May 22, 2014

(65) Prior Publication Data
US 2015/0294024 A1    Oct. 15, 2015

(30) Foreign Application Priority Data

Nov. 16, 2012 (CN) .......................... 2012 1 0464724
Dec. 3, 2012 (CN) .......................... 2012 1 0510351
Dec. 3, 2012 (CN) .......................... 2012 1 0511244

(51) Int. Cl.
  *G06F 15/16*       (2006.01)
  *G06F 17/30*       (2006.01)
  *H04L 29/08*       (2006.01)

(52) U.S. Cl.
  CPC .. *G06F 17/30905* (2013.01); *G06F 17/30884* (2013.01); *H04L 67/02* (2013.01); *H04L 67/06* (2013.01)

(58) Field of Classification Search
  CPC ......... G06F 17/30905; H04L 29/08072; H04L 29/06; H04L 29/0809
  (Continued)

(56) References Cited

U.S. PATENT DOCUMENTS 6,002,398 A * 12/1999 Wilson .................. G06F 3/0481
                                                      715/777
7,406,664 B1    7/2008 Morton et al.
(Continued)

OTHER PUBLICATIONS

Zuhui, H. et al, English translation of Abstract only of Chinese Application No. CN101419602 A, Publication Date: Apr. 29, 2009, Title: Edition interface generating method of office document based on web, one page.
(Continued)

*Primary Examiner* — Alan S Chou
(74) *Attorney, Agent, or Firm* — Polsinelli PC

(57) ABSTRACT

The invention discloses a file management method comprising: receiving an instruction input by a user, and determining the type of an object corresponding to the instruction; loading a corresponding browser window according to the determined type of the object; and displaying content of the object in the browser window. The invention discloses a data transmission device for bidirectional data transmission between a network side and a local client. The invention discloses a file display device for a browser supporting multi-page display comprising: a tab generation module configured to generate a corresponding tab according to content displayed by a page when the browser opens the page, wherein the content displayed by the page comprises a local file and/or a network file; and a display module configured to, for each page, display content of the page and a corresponding tab in an interface of the browser.

13 Claims, 14 Drawing Sheets

(58) Field of Classification Search
USPC .......................................................... 709/217
See application file for complete search history.

(56) References Cited

U.S. PATENT DOCUMENTS

| | | |
|---|---|---|
| 2004/0049541 A1 | 3/2004 | Swahn |
| 2004/0268364 A1* | 12/2004 | Faraj ..................... G06F 3/0482 719/316 |
| 2007/0033155 A1 | 2/2007 | Landsman |
| 2009/0044146 A1* | 2/2009 | Patel ....................... G06F 3/048 715/808 |
| 2010/0268828 A1* | 10/2010 | Pahlavan .............. G06F 9/4445 709/227 |
| 2011/0128573 A1 | 6/2011 | Ookuma |

OTHER PUBLICATIONS

Chunmei, Z. et al, English translation of Abstract only of Chinese Application No. CN 101431713B, Publication Date: Jul. 14, 2010, Title: Resource access method and equipment, one page.

Jiaolin, L., English translation of Abstract only of Chinese Application No. CN101459669 A, Publication Date: Jun. 17, 2009, Title: Access method and apparatus for network file system, one page.

Baosheng, L., English translation of Abstract only of Chinese Application No. CN101477558A, Publication Date: Jul. 8, 2009, Title: Browser label management method and multi-page browsing system, one page.

International Search Report regarding PCT/CN2013/083726 dated Dec. 19, 2013, 2 pages.

Yuan, Y. et al, English translation of Abstract only of Chinese Application No. CN102109944A, Publication Date: Jun. 29, 2011, Title: Window management method, device thereof and computer, one page.

* cited by examiner

FILE MANAGEMENT METHOD AND DEVICE

FIELD OF THE INVENTION

The invention relates to the field of network application, and in particular, to a file management method and a file management device.

BACKGROUND OF THE INVENTION

A browser refers to a kind of software which may display content of an HTML (Hypertext Markup Language) file of a web page server or a file system and let a user interact with the files. A web page browser mostly interacts with a web page server and obtains a web page by the HTTP protocol (HyperText Transfer Protocol), the web pages are specified by a URL (Uniform/Universal Resource Locator), the file format thereof is generally the HTML, and is indicated in the HTTP protocol by MIME (Multipurpose Internet Mail Extension).

In one web page may be comprised multiple documents, and each document is obtained from a server, respectively. Most browsers themselves support a wide range of formats besides HTML, for example, an image format such as JPEG, PNG, GIF, etc., and can be extended to support a multitude of plug-ins. In addition, many browsers further other types of URLs and their corresponding protocols, e.g., FTP (File Transfer Protocol), Gopher (The Internet Gopher Protocol, an RFC-1436 internet Gopher protocol), HTTPS (an encrypted version of the HTTP protocol). The type of HTTP content and the specifications for the URL protocol allow a web page designer to embed an image, animation, video, sound, stream media, etc. in a web page. Common web page browsers on personal computers comprise Internet Explorer (IE for short) of Microsoft, Firefox of Mozilla, Safari of Apple, Opera, Google Chrome, GreenBrowser browser, 360 secure browser, Sogou high-speed browser, Tiantian browser, Tencent TT, Maxthon browser, Baidu browser, Tencent QQ browser, etc.

Additionally, besides the function of directly opening a web page, a browser further has other functions. For example, favorites will be present in a browser, which is used for a user to view collected web pages.

However, there are few interfaces by which a current browser accesses a file system local to the browser. Thus, the access to and operation of the local file system by the browser is not very convenient, and in turn the management of a local file can not be well done.

Further, when a user is operating a local file, he generally uses a file resource manager (File Explorer), which was formerly known as Windows resource manager (Windows Explorer) and is a basic tool for viewing a file in Windows. In Windows 8, this program is renamed as a file resource manager.

Thus it can be seen that at the present stage, the file resource manager for managing a local file and the web page browser for managing a network file are separated, and there is not an interaction between the two. However, with the development of the network, the possibility of interaction with a local file on the network becomes higher and higher, for example, it is needed to upload some local files in the network. At this time, it is necessary for a browser to be capable of managing a local file, however, the existing management of different types of files is separate and independent, which leads to a complex procedure of data transmission or synchronization between the network side and the locality, and wastes a large number of resources.

Further, when a user utilizes a file resource manager to operate a local file, the display of a local resource by the file resource manager is of a single interface, multiple presentation interfaces can not be reserved simultaneously, the switching operation of the user is inconvenient, and the operation efficiency is low.

SUMMARY OF THE INVENTION

In view of the above problems, the invention is proposed to provide a file management method and a corresponding file management device which overcome the above problems or at least in part solve or mitigate the above problems.

According to an aspect of the invention, there is provided a file management method comprising: receiving an instruction input by a user, and determining the type of an object corresponding to the instruction; loading a corresponding browser window according to the determined type of the object; and displaying content of the object in the browser window.

According to another aspect of the invention, there is provided a file management device comprising: a user input module configured to receive an instruction input by a user, and determine the type of an object corresponding to the instruction; a loading module configured to load a corresponding browser window according to the determined type of the object; and a display module configure to display content of the object in the browser window.

In embodiments of the invention, the browser window is not only limited to displaying content of a web page obtained from a network server or a file system, but also will display content of a different object according to the needs of a user, for example, it may display content of a local file. It is thus can be seen that employing the method provided by embodiments of the invention, content of different objects can be displayed in the browser window, that is, the browser may invoke objects of different types, and in turn can access and operate a local file system, thereby implementing management of a local file utilizing the browser, and a user of a terminal does not need to specifically again open a file resource manager to manage a local file, which realizes the integration of a file manager local to a browser into a web page browser, saves resources of a system, and improves the browsing efficiency.

According to yet another aspect of the invention, there is provided a computer program comprising a computer readable code which causes a server to perform the file management method according to any of claims 1-11, when said computer readable code is running on the server.

According to still another aspect of the invention, there is provided a computer readable medium storing the computer program as claimed in claim 23 therein.

The beneficial effects of the invention lie in that: in embodiments of the invention, the browser window is not only limited to displaying content of a web page obtained from a network server or a file system, but also will display content of a different object according to the needs of a user, for example, it may display content of a local file. It is thus can be seen that employing the method provided by embodiments of the invention, content of different objects can be displayed in the browser window, that is, the browser may invoke objects of different types, and in turn can access and operate a local file system, thereby implementing management of a local file utilizing the browser, and a user of a terminal does not need to specifically again open a file resource manager to manage a local file, which realizes the integration of a file manager local to a browser by a web page browser, saves resources of a system, and improves the browsing efficiency.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

In the following the invention will be further described in connection with the drawings and the particular embodiments.

It is mentioned in the related arts that, there are few interfaces by which a current browser accesses a file system local to the browser. Thus, access to and an operation of the local file system by the browser is not very convenient, and in turn the management of a local file can not be well done.

However, in the procedure of applying a terminal, in addition to browsing a web page obtained from a web page server or a file system, the terminal may further be needed to browser or perform other operation of a file stored locally. To achieve this function, in the terminal is further arranged a file resource manager (File Explorer), which was formerly known as Windows resource manager (Windows Explorer) and is a basic tool for viewing a file in Windows. In Windows 8, this program is renamed as a file resource manager. In general, Windows users will not pay special attention to this function, and most of them only use the start menu to open a folder such as "documents", "pictures", "music", etc. While a fold is being viewed, the Windows resource manager is actually being used.

For a browser user used to the windows file management, the access to and operation of a local file system by a browser is not very convenient, and the browser can not be utilized to manage a local file, for example, perform the access to and operation of the local file system, such as web page saving, software download, and file upload, etc.

Figure 1:
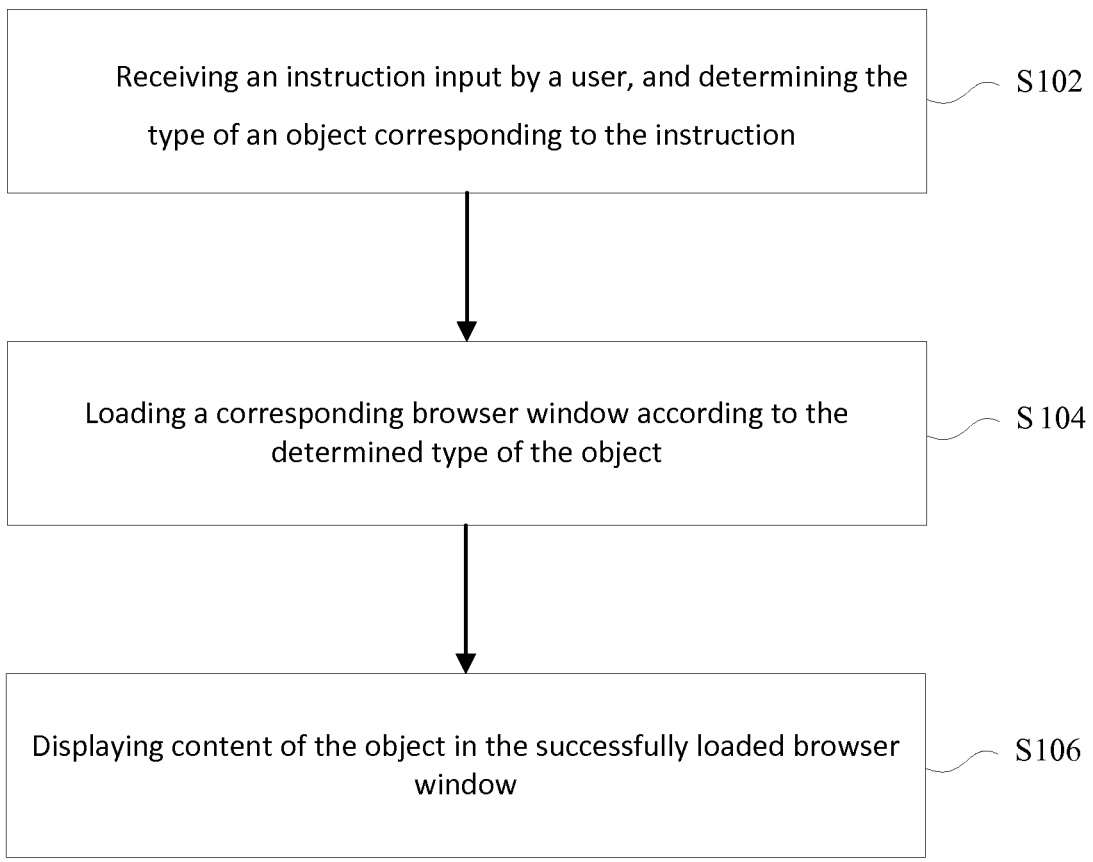
FIG. 1 shows a processing flow chart of a file management method according to an embodiment of the invention.

To resolve the above technical problems, an embodiment of the invention makes an improvement on an existing browser, and utilizes the improved browser to provide a file management method. FIG. 1 shows a processing flow chart of a file management method according to an embodiment of the invention. Referring to FIG. 1, the file management method comprises step S102 to S106.

At step S102, receiving an instruction input by a user, and determining the type of an object corresponding to the instruction.

At step S104, loading a corresponding browser window according to the determined type of the object.

At step S106, displaying content of the object in the successfully loaded browser window.

In the embodiment of the invention, the browser window is not only limited to displaying content of a web page obtained from a network server or a file system, but also will display content of a different object according to the needs of a user, for example, it may display content of a local file. It is thus can be seen that employing the method provided by the embodiment of the invention, content of different objects can be displayed in the browser window, that is, the browser may invoke objects of different types, and in turn can access and operate a local file system, thereby implementing management of a local file utilizing the browser, and a user of a terminal does not need to specifically again open a file resource manager to manage a local file, which realizes the integration of a file manager local to a browser into a web page browser, saves resources of a system, and improves the browsing efficiency.

In the flow as shown in FIG. 1, it is proposed that it is needed to determine the type of an object corresponding to an instruction input by a user when step S102 is implemented. It needs to be noted that, there may be multiple types of the object, for example, it may be a network file (generally indicated with a URL address), or also may be a local file (generally indicated with a local path), or also may be a file stored by some external memories (e.g., flash memory), or the like. In general, what are commonly used are the URL address and the local path. Therefore, when implemented, it may give preference to determining whether the type of the object is a uniform resource locator URL, and if yes, it is determined that the object is a network object. If no, then it may be judged whether the type of the object is a local path, and if yes, it is determined that the object is a local object. If it is neither of the two types, it is further judged whether it is other third or fourth type. In the following description of the invention, to simplify the description, a local object (local content) contains in a broad sense other objects (other content) except a network object, for example, content stored locally, and content stored by some external memories (e.g., a flash memory), etc.

Preferably, when the object indicated by the instruction input by a user is a network object, a processing way for a network object (e.g., web page) is selected. At this point, loading a corresponding browser window should be loading a network browser window, and accordingly, content of a web page corresponding to the network object is displayed in the successfully loaded network browser window.

If the object indicated by the instruction input by a user is a local object, then a processing way for a local object (e.g., local file or folder) is selected. At this point, loading a corresponding browser window should be loading a local browser window. Accordingly, local content corresponding to the local object is displayed in the successfully loaded local browser window.

Of course, before the local content is displayed, it is needed to find out the corresponding local object. It may be possible to determine a local path of the local object according to the user instruction, in turn find out the corresponding local object according to the determined local path, and obtain its content for being displayed in the browser window subsequently.

According to a different type of the local object, the content of the object displayed in the local browser window is not exactly the same. Now, two particular examples are taken to illustrate this.

If the local object is a local file, then considering that the file itself is single, and its content is relatively simple, the content of the file may be displayed directly in the local browser window in the form of a web page. In particular, the local path of the local file is confirmed according to the instruction of the user, the corresponding local file is found out according to the local path, and then the found local file is displayed in the local browser window.

When the local file is a local folder, since the folder itself is multileveled, in the folder there may be further comprised a folder or comprised multiple files. At this point, it is impossible to display all the content in a browser window, and therefore, it suffices to display information on a folder(s) and a file(s) contained in the folder in the local browser window. Of course, on the terminal there are sufficient browser windows, and it is also feasible to provide for each file in the local folder a browser window for display, but it will consume a lot of resources and a user generally does not need to open multiple folders simultaneously. That the information in the folder is presented to the user for the user to select a folder or file that he needs to open can save a plenty of resources, and is also rapid for the user to obtain information.

Considering the multilevel nature of the folder itself, therefore, in the local browser window, it may be preferable to display the information on a folder(s) and a file(s) contained in the folder in a tree structure, wherein an individual folder acts as a node of the tree structure. The tree structure may sufficiently and clearly show a parent-child relationship between folders at individual levels, and improve the visual effect of the user.

Figure 2:
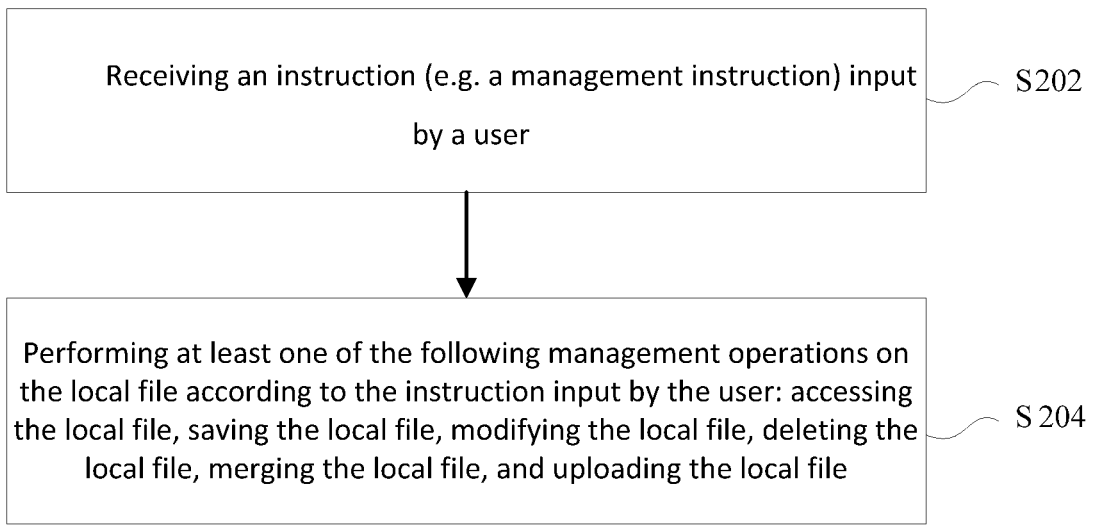
FIG. 2 shows a processing flow chart of a browser managing a local file according to an embodiment of the invention.

Further, a local file may be invoked and displayed in a local browser window, and then in this example, the browser may also perform other access and operation on the displayed local file, thereby implementing the management of the local file by the browser. FIG. 2 shows a processing flow chart of a browser managing a local file according to an embodiment of the invention, which comprises step S202 to step S204.

At step S202, receiving an instruction (e.g. a management instruction) input by a user.

At step S204, performing at least one of the following management operations on the local file according to the instruction input by the user: accessing the local file, saving the local file, modifying the local file, deleting the local file, merging the local file, and uploading the local file.

The management operations here are just illustrative, which does not result in limitation to a management operation, and in an actual application of the browser, other operation may also be selected according to the needs of the user.

In addition, on an interface of the browser there may be simultaneously presented multiple pieces of display content, and how to differentiate between different display content and how to select to open displayed content need corresponding solutions. In this example, there is provided a preferred solution, namely, in a browser window, a different tab is utilized to point to different display content. Accordingly, for displaying content of an object in a browser window, a tab may be utilized for display, and when content of an object queried most recently by the user is pointed to a new tab, an already displayed tab is utilized to point to previously displayed object content, wherein the new tab and the already displayed tab are displayed simultaneously in the browser window. For example, after newest object content is displayed, if the user wants to refer to previously opened object content, he may select to click the tab of the previous object content and then can switch to the previous interface. According to an embodiment of the invention, the tab may comprise a network tab and a local tab to point to content of a network object and content of a local object, respectively.

Further, the browser may select to display a history of local files in a browser window, and thus when the user searches some local files next time, he may search in the history of local files and does not need to open each file path one by one, which can save resources.

In an actual application, there is certain regularity in folders opened by the user. For example, the user might store part of work content in a work folder, and the opening frequency of the folder is necessarily high. For another example, private information of the user is usually also a part for which the opening frequency is relatively high. Therefore, the browser may reorganize the history of local files and arrange a folder for which the opening frequency is relatively high at the top. Additionally, the browser may also sort the history of local files according to opening time. By the history of local files with a certain sorting, the user can find out an object that needs to be invoked and displayed more rapidly and more conveniently.

The file management method provided by the embodiment of the invention is applicable to a local file plug-in of a browser, wherein the local file plug-in may be separately arranged in the browser, or the local file plug-in is arranged in another plug-in of the browser, for example, in a toolbar plug-in, e.g., in a plug-in of the favorites, etc.

Now, a specific embodiment is provided to set forth and illustrate in detail the file management method of embodiments of the invention.

Embodiment 1

In this example, the local file plug-in is arranged in the plug-in of the favorites. Since a local file manager generally unfolds a directory of files in a left side frame, this example will also employ the same unfolding manner as it.

Figure 3:
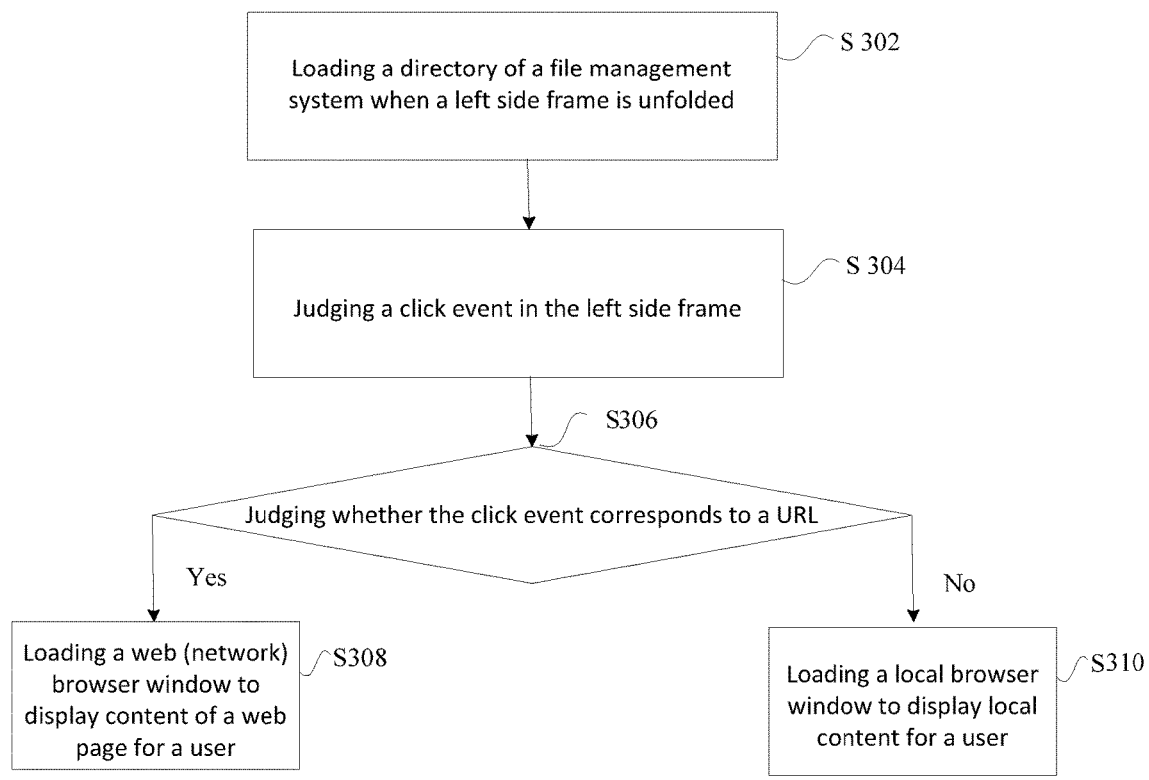
FIG. 3 shows a specific flow chart of a file management method according to an embodiment of the invention.

FIG. 3 shows a specific flow chart of a file management method according to an embodiment of the invention. Referring to FIG. 3, the file management method in this example comprises step S302 to step S310.

At step S302, when a left side frame is unfolded, a directory of a file management system is loaded. For a particular schematic diagram, reference is made to FIG. 4.

At step S304, a click event in the left side frame is judged, and it is judged whether the click event corresponds to a URL or a file (a local file).

At step S306, a different display window is loaded in a browser window according to the judgment result, and if it is a URL, then step S308 is performed; and if it is a file, step S310 is performed.

At step S308, a web (network) browser window is loaded to display content of a web page for a user.

Figure 5:
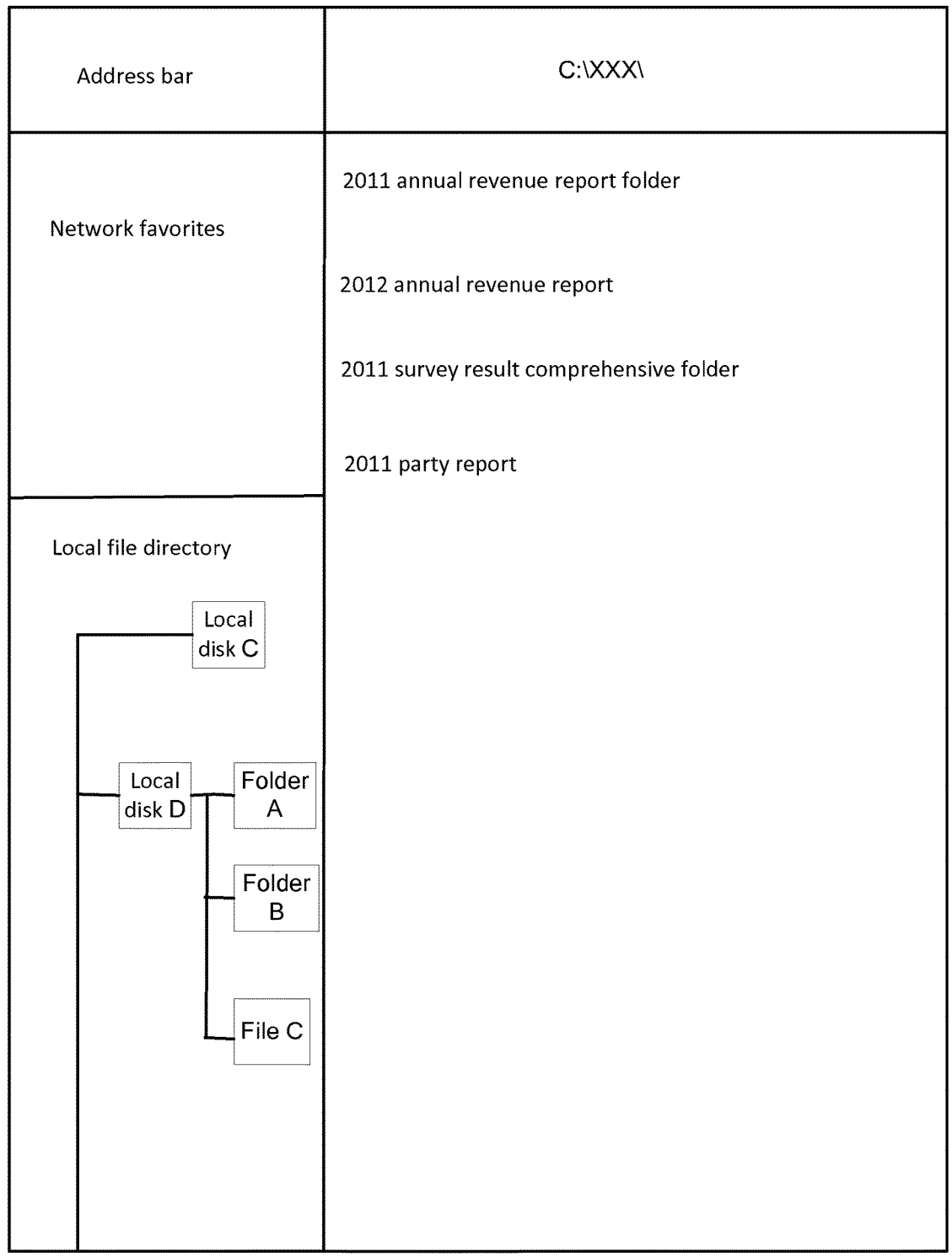
FIG. 5 shows a schematic diagram of a directory of a tree structure according to an embodiment of the invention.

At step S310, a local browser window is loaded to display local content for a user. In particular, if it is a single file, then content of the file is directly for the user, and with respect to the type of the file, at the browser side, according to the type of a plug-in already loaded and installed by it, the plug-in is loaded to display the file, for example, a PDF file, a word file, various pictures, etc. If it is a folder, a directory of a different tree structure is unfolded according to the click of the user, and FIG. 5 provides a particular schematic diagram.

Figure 4:
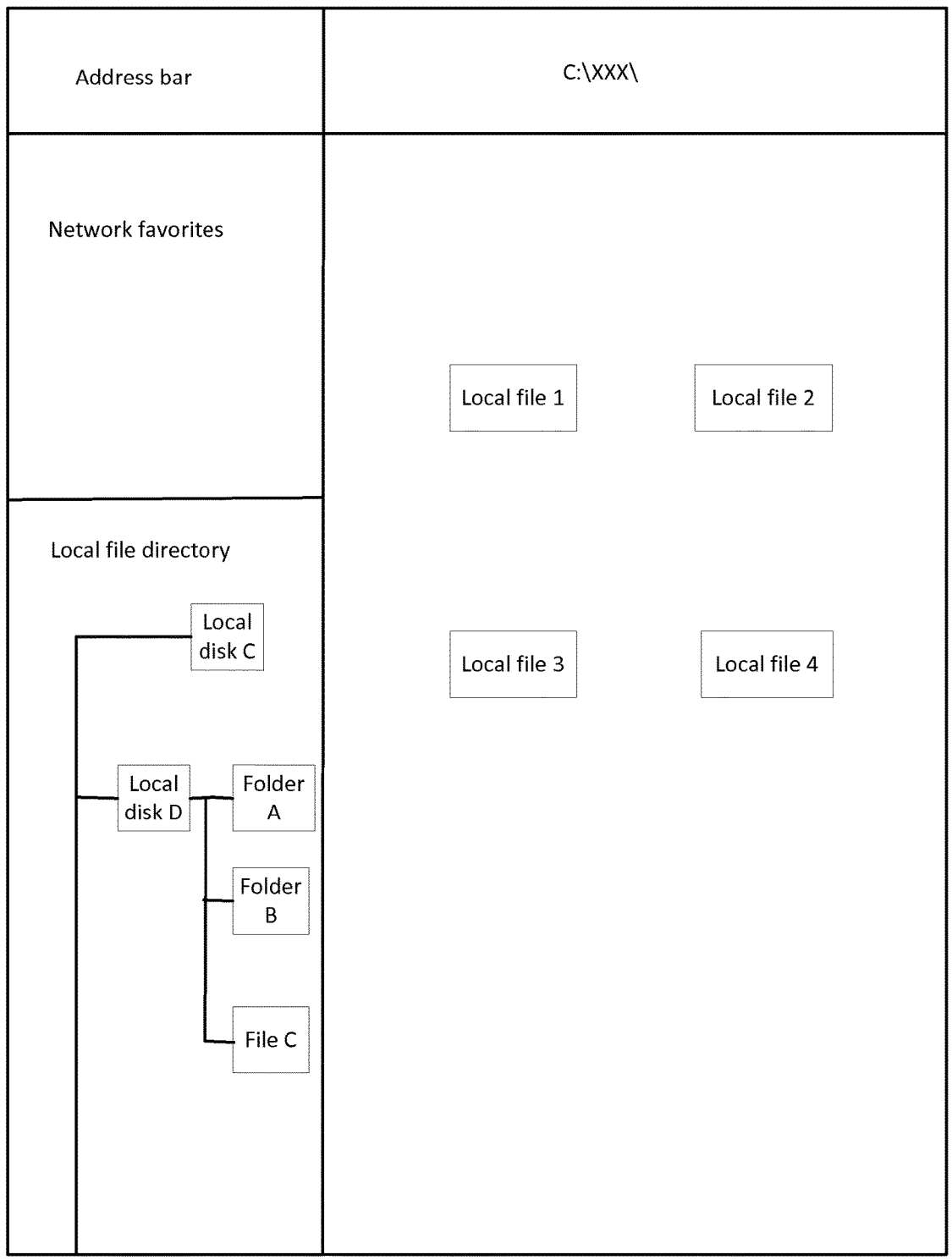
FIG. 4 shows a schematic diagram of loading a page of a directory of a file management system according to an embodiment of the invention.

In the left frame of the browser in FIG. 4, the initial plug-in display is network favorites, wherein when an event that the user clicks to open the left frame happens, besides the loading of the existing network favorites, PC local disks will also be added, comprising a mobile apparatus, various languages are supported by corresponding functions (e.g., Environment class in C#, etc.), and the content thereof is unfolded in turn and displayed after the click, and the result will be arranged within a browser window on the right side.

When step S304 is implemented, in particular, the user clicks an item in the left frame, and it is judged whether the clicked item is an option of a URL or a non-URL file type. When it is judged to be a URL, it will be recognized to open a web page, and a web window will be loaded dynamically in a right window to load a web page tab corresponding to the above URL. When it is judged not to be a URL, it will be recognized to open a folder or file information, and a file window (local browser window) will be loaded dynamically in a right window to load a file and folder information under a corresponding directory and load a file tab, wherein the file tab may be differentiated from the web page tab to indicate the difference. In this example, the file tab is indicative of a tab of a local file. According to characteristics of a local file, there are many ways of implementing a local tab. Now, several particular examples are provided, for example, the address of the local file may act as a file tab, or the file name of the local file may act as a file tab, or a search keyword of the local file may act as a file tab. When particularly implemented, to more easily differentiate between the file tab and the web page tab, one can consider setting the file tab to be a highlighted character, etc. to distinguish their display. The obtaining of the file and folder information here is to obtain, from a node in a tree directory of a file manager clicked by the user, the file and folder information under the node.

Further, when what is loaded and displayed in a Web window is a file, a local path of the file may be displayed in the address bar. The Tab mark therein may be differentiated from other Web page to indicate the difference.

Employing the file management method provided by the embodiment of the invention realizes the combination of a Web browser with a local browser and facilitates the use for a user.

Figure 6:
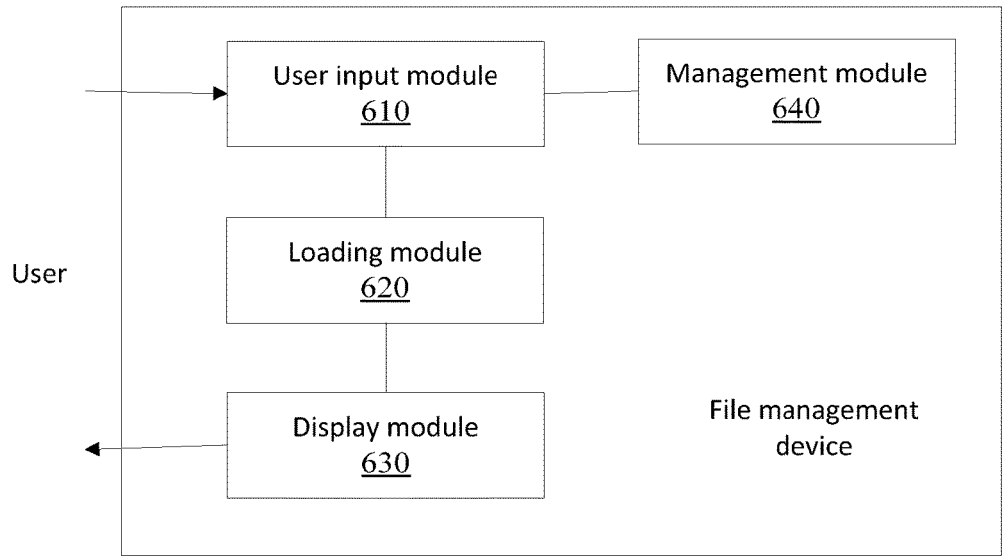
FIG. 6 shows a structural schematic diagram of a file management device according to an embodiment of the invention.

FIG. 6 shows a structural schematic diagram of a file management device according to an embodiment of the invention. The file management device and the file management method mentioned above pertain to the same inventive concept. Referring to FIG. 6, the file management device comprises a user input module 610, a loading module 620 and a display module 630. Now, the functions and architectures of individual modules are described respectively.

First, the user input module 610 receives an instruction input by a user, and determines the type of an object corresponding to the instruction. Here, there may be multiple types of the object, for example, it may be a network file (generally indicated with a URL address), or also may be a local file (generally indicated with a local path), or also may be a file stored by some external memories (e.g., flash memory), or the like. In general, what are commonly used are the URL address and the local path. Therefore, when implemented, it may give preference to determining whether the type of the object is a uniform resource locator URL, and if yes, it is determined that the object is a network object. If no, then it may be judged whether the type of the object is a local path, and if yes, it is determined that the object is a local object. If it is neither of the two types, it is further judged whether it is other third or fourth type.

Second, the loading module 620 is coupled to the user input module 610, and can load a corresponding browser window according to the type of the object determined by the user input module 610.

Then, the display module 630 is coupled to the loading module 620 and displays content of the object in the browser window.

Therein, preferably, when the user input module 610 judges that the object indicated by the instruction input by a user is a network object, a processing way for a network object (e.g., web page) is selected. At this point, loading a corresponding browser window by the loading module 620 should be loading a network browser window, and accordingly, the display module 630 displays content of a web page corresponding to the network object in the successfully loaded network browser window.

If the user input module 610 judges that the object indicated by the instruction input by a user is a local object, then a processing way for a local object (e.g., local file or folder) is selected. At this point, loading a corresponding browser window by the loading module 620 should be loading a local browser window. Accordingly, the display module 630 displays local content corresponding to the local object in the successfully loaded local browser window.

Of course, before the local content is displayed, it is needed to find out the corresponding local object. Preferably, the display module 630 will determine a local path of the local object according to the user instruction, in turn find out the corresponding local object according to the determined local path, obtain its content and display the found local file in the local browser window.

According to a different type of the local object, the content of the object displayed in the local browser window is not exactly the same. If the local object is a local file, then considering that the file itself is single, and its content is relatively simple, the content of the file may be displayed directly in the local browser window in the form of a web page. In particular, when the local file is a single file, the display module 630 displays the information of the single file in the local browser window in the form of a web page.

When the local file is a local folder, since the folder itself is multileveled, in the folder there may be further comprised a folder or comprised multiple files. At this point, it is impossible to display all the content in a browser window, and therefore, it suffices to display information on a folder(s) and a file(s) contained in the folder in the local browser window. Of course, on the terminal there are sufficient browser windows, and it is also feasible to provide for each file in the local folder a browser window for display, but it will consume a lot of resources and a user generally does not need to open multiple folders simultaneously. That the information in the folder is presented to the user for the user to select a folder or file that he needs to open can save a plenty of resources, and is also rapid for the user to obtain information. In particular, when the local file is a folder, the display module 630 displays information on a folder(s) and a file(s) contained in the folder in the local browser window.

Considering the multilevel nature of the folder itself, therefore, preferably, in the local browser window, the display module 630 displays the information on a folder(s) and a file(s) contained in the folder in a tree structure, wherein an individual folder acts as a node of the tree structure. The tree structure may sufficiently and clearly show a parent-child relationship between folders at individual levels.

Referring to FIG. 6, the file management device further comprises a management module 640. The management module 640 is coupled to the user input module 610, and can perform at least one of the following management operations on the local file according to the instruction input by the user received by the user input module 610:

accessing the local file, saving the local file, modifying the local file, deleting the local file, merging the local file, and uploading the local file.

The management operations here are just illustrative, which does not result in limitation to a management operation, and in an actual application of the browser, other operation may also be selected according to the needs of the user.

In addition, in a browser window, a different tab may be utilized to point to different display content, wherein a new tab and the already displayed tab are displayed simultaneously in the browser window. At this point, when content of an object queried most recently by the user is pointed to according to the new tab, the display module 630 may utilize the already displayed tab to point to previously displayed object content. For example, after newest object content is displayed, if the user wants to refer to previously opened object content, he may select to click the tab of the previous object content and then can switch to the previous interface. According to an embodiment of the invention, the tab may comprise a network tab and a local tab to point to content of a network object and content of a local object, respectively.

Further, the display module 630 may select to display a history of local files in a browser window, and thus when the user searches some local files next time, he may search in the history of local files and does not need to open each file path one by one, which can save resources.

The file management device provided by the embodiment of the invention may be arranged in a local file plug-in of a browser, wherein the local file plug-in is separately arranged in the browser, or the local file plug-in is arranged in another plug-in of the browser.

For the file management device provided by the above embodiment, a module division is performed on it only according to its functions, and in an actual application, the file management device may further have other structures or modules or components or devices, which are not limited to the architecture provided by the invention.

The file management method and its corresponding device provided by embodiments of the invention can achieve the following beneficial effects:

In embodiments of the invention, the browser window is not only limited to displaying content of a web page obtained from a network server or a file system, but also will display content of a different object according to the needs of a user, for example, it may display content of a local file. It is thus can be seen that employing the method provided by embodiments of the invention, content of different objects can be displayed in the browser window, that is, the browser may invoke objects of different types, and in turn can access and operate a local file system, thereby implementing management of a local file utilizing the browser, and a user of a terminal does not need to specifically again open a file resource manager to manage a local file, which realizes the integration of a file manager local to a browser by a web page browser, saves resources of a system, and improves the browsing efficiency.

Figure 7:
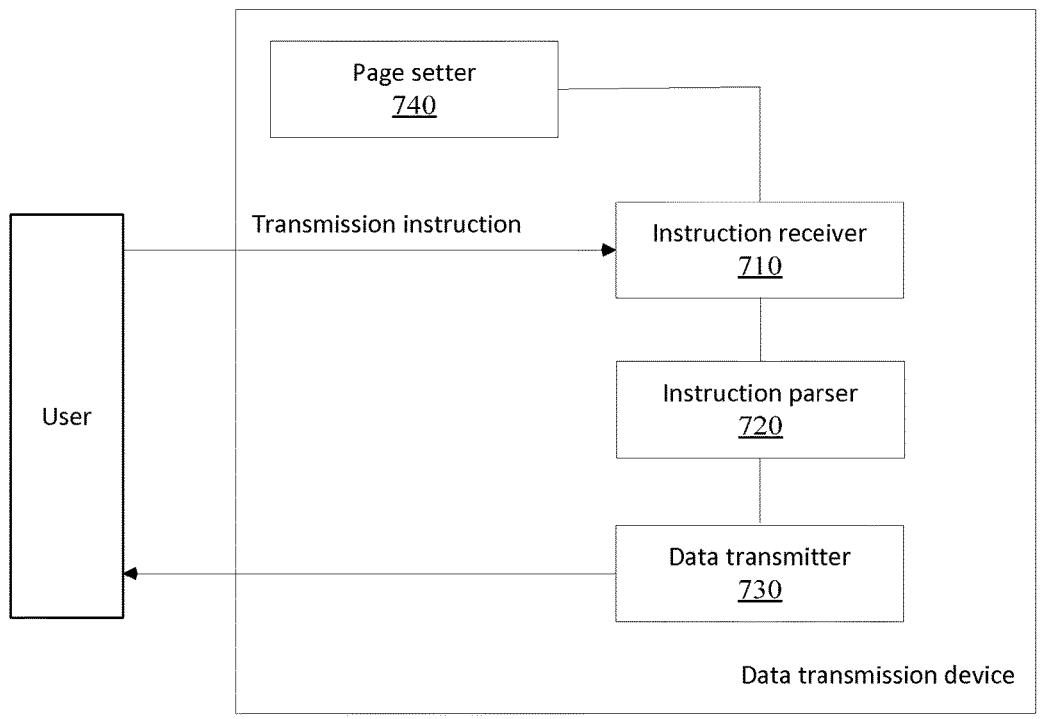
FIG. 7 shows a structural schematic diagram of a data transmission device according to an embodiment of the invention.

To solve at least one of the above technical problems, an embodiment of the invention further provides a data transmission device. FIG. 7 shows a structural schematic diagram of a data transmission device according to an embodiment of the invention, which is configured for bidirectional data transmission between a network side and a local client. Referring to FIG. 7, the data transmission device comprises at least an instruction receiver 710, an instruction parser 720 and a data transmitter 730. Now, the composition architecture of individual devices or modules or components in the data transmission device and their corresponding functions are described respectively.

First, the instruction receiver 710 is introduced. In this example, the function of the instruction receiver is to receive a transmission instruction of a user, and forward the transmission instruction to the instruction parser 720 for parsing.

Second, the instruction parser 720 is introduced. Referring to FIG. 7, the instruction parser 720 is coupled to the instruction receiver 710. The instruction parser 720 parses out information of data to be transmitted and destination information according to the transmission instruction forwarded by the instruction receiver 710.

Last, the data transmitter 730 is introduced. Referring to FIG. 7, the data transmitter 730 is coupled to the instruction parser 720. According to the information of data to be transmitted and the destination information parsed out by the instruction parser 720, the data transmitter 730 obtains the data to be transmitted and transmits the data to be transmitted to the destination.

In an embodiment of the invention, parse is performed after a transmission instruction sent by a user is received, and thereby information of the data to be transmitted itself and the destination information are received. Subsequently, the data transmitter may perform data transmission according to the destination of the data to be transmitted, and if the destination is a network side, it may transmit the data to the network side; and if the destination is a local client, it may transmit the data to the local client. Employing the data transmission device provided by the embodiment of the invention, the transmission of data between the network side and the local client may be realized, the transmission way is simple and convenient, and the data transmission efficiency is improved.

Therein, the information of data to be transmitted parsed out by the instruction parser 720 may comprise any information of the data, for example, the address of the data to be transmitted, the type of the data to be transmitted, and the volume of the data to be transmitted. After knowing the information of the data to be transmitted, the data transmitter 730 may determine to go to which address or which server to obtain the data according to the information. If the data is too large and the obtaining time is relatively long, it may further select a cache according to the volume of the data to facilitate data storage in the procedure of obtaining the data and in the procedure of transmitting the data, and avoid data loss.

Further, if the data volume is too large, in a subsequent transmission procedure, the data transmitter may further select to divide the data into different data packets for transmission, and the different data packets are aggregated when they are transmitted to the destination, which avoids the occurrence of the possibility of network congestion and in turn network crash due to the data packet being too large.

In a preferred embodiment, the data to be transmitted comprises a file. Of course, the data may also not be a file. Since in applications, a file is applied more, has certain representativeness and is relatively vivid, a file is taken as an example for illustration in this embodiment.

It is mentioned in the related arts that a browser may access a network file, and may implement various operations on the network file, whereas a file resource manager local to a client only has several limited operations for a local file. Therefore, to fully take advantage of existing resources, the data transmission device provided by the invention is preferably arranged in the browser, and utilizes various plug-ins in the browser to implement data transmission between the network side and the local client.

Accordingly, for conveniently processing a network file and a local file simultaneously, it may be arranged that a list of files at the network side and a list of files at the local client are displayed simultaneously on one and the same browser page. At this point, lists of files of the two are displayed simultaneously on the browser page, the name of each file is a link which may be linked to its corresponding memory address, and a corresponding file may be opened by clicking a respective file name. For example, a Sina homepage may be opened by clicking www.sina.com, and the D disk in a local disk may be opened by clicking the local disk D:.

At this point, on a page, the user may move the logo of a file to be transmitted to the destination in a dragging way, thereby implementing the transmission of the file between the network side and the local client. The essence lies in that the user dragging the logo is just to send a corresponding transmission instruction, and the data transmitter 730 will transmit a file corresponding to the logo to the destination according to the transmission instruction.

When the type of the file to be transmitted is a network file and the destination is a local client, the data transmitter 730 selects a network address of the file to be transmitted, and drags the network address into a list of files of the local client on the page.

Accordingly, when the type of the file to be transmitted is a local file and the destination is a network side, the data transmitter 730 selects a local storage path of the file to be transmitted, and drags the local storage path into a list of files of the network side on the page.

When the type of the file to be transmitted is a network file, the instruction parser 720 need obtain a network address of the network file. There are multiple ways of obtaining the network address from a browser page, for example, the network address of the file to be transmitted is obtained by utilizing at least one of the following ways: obtaining it from the address bar of the browser; obtaining it from the network browsing history of the browser; and obtaining it from items stored in the favorites of the browser.

If there further exists in the browser that a network address of the file to be transmitted is also recorded in other plug-ins, the instruction parser 720 may also obtain the corresponding network address from the other plug-ins.

After the network address is obtained, according to the network address, the data transmitter 730 obtains content of a web page corresponding to the network address in the browser. Then, the data transmitter 730 will transmit the content of the web page via streaming into a folder in the local client which the network address has been dragged to, thereby implementing the data (file) transmission from the network side to the local side.

After the transmission is finished, the content of the web page need be stored in the local client, and a file is generated to store the content of the web page. At this point, to identify the content of the web page, a file title need be generated in a folder of the local client. For conveniently identifying the content of the web page, in a preferred embodiment, a headline of the content of the web page may be employed as the file title of the file storing the content of the web page. Of course, other file title may also be selected, for example, a keyword of the content of the web page is used as the file title, or the transmission time of the content of the web page is taken as the file title, and the like.

When a file is transmitted from the network side into the local client, the data transmitter 730 may preferably stream the content of the web page into a temporary file of the local client in the streaming procedure, due to protection of the integrity of data. After all the data is transmitted successfully, the data transmitter 730 then re-streams the content of the web page from the temporary file into a folder corresponding to the destination.

If a transmission failure appears in the streaming procedure, the data transmitter 730 will prompt the transmission failure or retransmission. The user need only perform a corresponding selection according to the indicated information, for example, retransmit or give up transmission, etc.

It is mentioned above that the direction of data transmission is bidirectional, and therefore, in addition to being capable of transmitting a network file from the network side to the local client, the data transmitter 730 may further upload a local file of the local client to the network side.

In particular, a file list of network files and a file list of local files are displayed simultaneously on a browser page, and the data transmitter 730 will browse through the file list of local files in the browser to obtain a local storage path. Further, the data transmitter 730 will obtain a file corresponding to the local storage path and upload information of the file according to the selection of the user.

In a preferred embodiment, the data transmitter 730 may further utilize a browser interface to prompt the user whether he selects to upload the local storage path of the file or the file content of the file or upload the two simultaneously, and afterwards upload the information of the file according to the selection of the user. For example, if it is only needed to upload the local storage path of the file, then it suffices to upload one piece of path information; and if it is needed to upload the file content, then the whole file need be packed and uploaded.

A file list of the network side and a file list of the local client are displayed simultaneously on a browser page, and therefore, referring to FIG. 7, in the data transmission device is further arranged a page setter 740. The page setter is coupled to the instruction receiver 710. The page setter 740 may set display modes of different lists in a browser, for example, the page setter 740 may specify that a file list of the network side and a file list of the local client are displayed simultaneously in a frame of the browser. For another example, the page setter 740 may also arrange two stand-alone frames in the browser, one for displaying a file list of the network side, and the other for displaying a file list of the local client. If a file list of the network side and a file list of the local client are displayed simultaneously in one and the same frame, the frame may be at the left side of a browser page, or also at the right side of a browser page, or at the bottom side, and it suffices to facilitate selection by the user. If in the two standalone frames are displayed a file list of the network side and a file list of the local client, respectively, the positions of the two frames may also be set according to the user's browsing preference.

In addition to the dragging way mentioned above, this embodiment further provides for the user another way of transmitting data. Since each logo on a page can be linked to a corresponding file, the data transmitter 730 may select to copy the logo of the file to be transmitted on the page, and then paste the copied logo to the destination. The destination may be linked to the corresponding file to be transmitted according to the logo obtained by copying, thereby implementing the transmission of a file between the network side and the local client.

Figure 8:
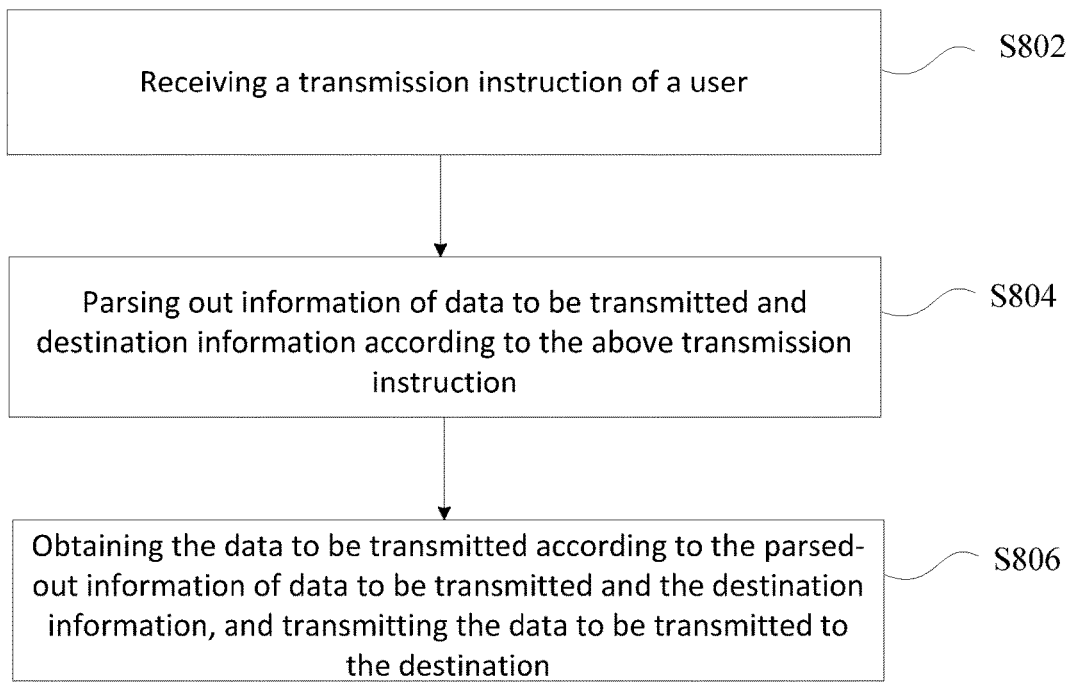
FIG. 8 shows a processing flow chart of a data transmission method according to an embodiment of the invention.

Based on one and the same inventive concept, an embodiment of the invention further provides a data transmission method configured for bidirectional data transmission between a network side and a local client. The implementation of the data transmission method may be based on the data transmission device in any one of the above preferred embodiments. FIG. 8 shows a processing flow chart of a data transmission method according to an embodiment of the invention comprising step S802 to step S806.

At step S802, a transmission instruction of a user is received. At step S804, information of data to be transmitted and destination information are parsed out according to the above transmission instruction. At step S806, the data to be transmitted is obtained according to the parsed-out information of data to be transmitted and the destination information, and the data to be transmitted is transmitted to the destination.

In an embodiment of the invention, parse is performed after a transmission instruction sent by a user is received, and thereby information of the data to be transmitted itself and the destination information are received. Subsequently, data transmission may be performed according to the destination of the data to be transmitted, and if the destination is a network side, the data may be transmitted to the network side; and if the destination is a local client, the data may be transmitted to the local client. Employing the data transmission method provided by the embodiment of the invention, the transmission of data between the network side and the local client may be realized, the transmission way is simple and convenient, and the data transmission efficiency is improved.

Therein, the parsed-out information of data to be transmitted may comprise any information of the data, for example, the address of the data to be transmitted, the type of the data to be transmitted, and the volume of the data to be transmitted. After knowing the information of the data to be transmitted, it may be determined to go to which address or which server to obtain the data according to the information. If the data is too large and the obtaining time is relatively long, it may further select a cache according to the volume of the data to facilitate data storage in the procedure of obtaining the data and in the procedure of transmitting the data, and avoid data loss.

Further, if the data volume is too large, in a subsequent transmission procedure, the data transmitter may further select to divide the data into different data packets for transmission, and the different data packets are aggregated when they are transmitted to the destination, which avoids the occurrence of the possibility of network congestion and in turn network crash due to the data packet being too large.

In a preferred embodiment, the data to be transmitted comprises a file. Of course, the data may also not be a file. Since in applications, a file is applied more, has certain representativeness and is relatively vivid, a file is taken as an example for illustration in this embodiment.

It is mentioned in the related arts that a browser may access a network file, and may implement various operations on the network file, whereas a file resource manager local to a client only has several limited operations for a local file. Therefore, to fully take advantage of existing resources, the data transmission method provided by the invention is applicable to the browser, and utilizes various plug-ins in the browser to implement data transmission between the network side and the local client.

Accordingly, for conveniently processing a network file and a local file simultaneously, it may be arranged that a list of files at the network side and a list of files at the local client are displayed simultaneously on one and the same browser page. At this point, lists of files of the two are displayed simultaneously on the browser page, the name of each file is a link which may be linked to its corresponding memory address, and a corresponding file may be opened by clicking a respective file name. For example, a Sina homepage may be opened by clicking www.sina.com, and the D disk in a local disk may be opened by clicking the local disk D:.

At this point, on a page, the user may move the logo of a file to be transmitted to the destination in a dragging way, thereby implementing the transmission of the file between the network side and the local client. The essence lies in that the user dragging the logo is just to send a corresponding transmission instruction, and a file corresponding to the logo may be transmitted to the destination according to the transmission instruction.

On a page, for moving a logo of a file to be transmitted to a destination in a dragging way, a particular processing way thereof is as follows:

First way: when the type of the file to be transmitted is a network file, a network address of the file to be transmitted is selected, and the network address is dragged into a list of files of the local client on the page.

Second way: when the type of the file to be transmitted is a local file, a local storage path of the file to be transmitted is selected, and the local storage path is dragged into a list of files of the network side on the page.

When the type of the file to be transmitted is a network file, it is first needed to obtain a network address of the network file. There are multiple ways of obtaining the network address from a browser page, for example, the network address of the file to be transmitted is obtained by utilizing at least one of the following ways: obtaining it from the address bar of the browser; obtaining it from the network browsing history of the browser; and obtaining it from items stored in the favorites of the browser.

If there further exists in the browser that a network address of the file to be transmitted is also recorded in other plug-ins, the corresponding network address may also be obtained from the other plug-ins.

After the network address is obtained, content of a web page corresponding to the network address may be obtained in the browser according to the network address. Then, the content of the web page is transmitted via streaming into a folder in the local client which the network address has been dragged to, thereby implementing the data (file) transmission from the network side to the local side.

After the transmission is finished, the content of the web page need be stored in the local client, and a file is generated to store the content of the web page. At this point, to identify the content of the web page, a file title need be generated in a folder of the local client. For conveniently identifying the content of the web page, in a preferred embodiment, a headline of the content of the web page may be employed as the file title of the file storing the content of the web page. Of course, other file title may also be selected, for example, a keyword of the content of the web page is used as the file title, or the transmission time of the content of the web page is taken as the file title, and the like.

When a file is transmitted from the network side into the local client, it may be preferable to stream the content of the web page into a temporary file of the local client in the streaming procedure, due to protection of the integrity of data. After all the data is transmitted successfully, then the content of the web page is re-streamed from the temporary file into a folder corresponding to the destination.

If a transmission failure appears in the streaming procedure, the transmission failure is prompted to the user or retransmission is performed. The user need only perform a corresponding selection according to the indicated information, for example, retransmit or give up transmission, etc.

It is mentioned above that the direction of data transmission is bidirectional, and therefore, in addition to being capable of transmitting a network file from the network side to the local client, it may further be possible to upload a local file of the local client to the network side.

In particular, a file list of network files and a file list of local files are displayed simultaneously on a browser page, and the file list of local files in the browser may be browsed through to obtain a local storage path. Further, a file corresponding to the local storage path is obtained and information of the file is uploaded according to the selection of the user.

In a preferred embodiment, a browser interface may be utilized to prompt the user whether he selects to upload the local storage path of the file or the file content of the file or upload the two simultaneously, and afterwards the information of the file is uploaded according to the selection of the user. For example, if it is only needed to upload the local storage path of the file, then it suffices to upload one piece of path information; and if it is needed to upload the file content, then the whole file need be packed and uploaded.

A file list of the network side and a file list of the local client are displayed simultaneously on a browser page, and display modes of different lists in a browser may be set, for example, it may be specified that a file list of the network side and a file list of the local client are displayed simultaneously in a frame of the browser. For another example, two standalone frames may also be arranged in the browser, one for displaying a file list of the network side, and the other for displaying a file list of the local client. If a file list of the network side and a file list of the local client are displayed simultaneously in one and the same frame, the frame may be at the left side of a browser page, or also at the right side of a browser page, or at the bottom side, and it suffices to facilitate selection by the user. If in the two standalone frames are displayed a file list of the network side and a file list of the local client, respectively, the positions of the two frames may also be set according to the user's browsing preference.

In addition to the dragging way mentioned above, this embodiment further provides for the user another way of transmitting data. Since each logo on a page can be linked to a corresponding file, it may be possible to select to copy the logo of the file to be transmitted on the page, and then paste the copied logo to the destination. The destination may be linked to the corresponding file to be transmitted according to the logo obtained by copying, thereby implementing the transmission of a file between the network side and the local client.

In order to set forth the data transmission method and device provided by embodiments of the invention more clearly and more apparently, they are now illustrated with a particular embodiment.

In this example, a list of files is presented in a left side frame on a page, and corresponding content is displayed in a right side window. When a user clicks a folder on the left side, the content of the folder corresponding to the logo that he clicks is displayed in the window on the right side.

Figure 9:
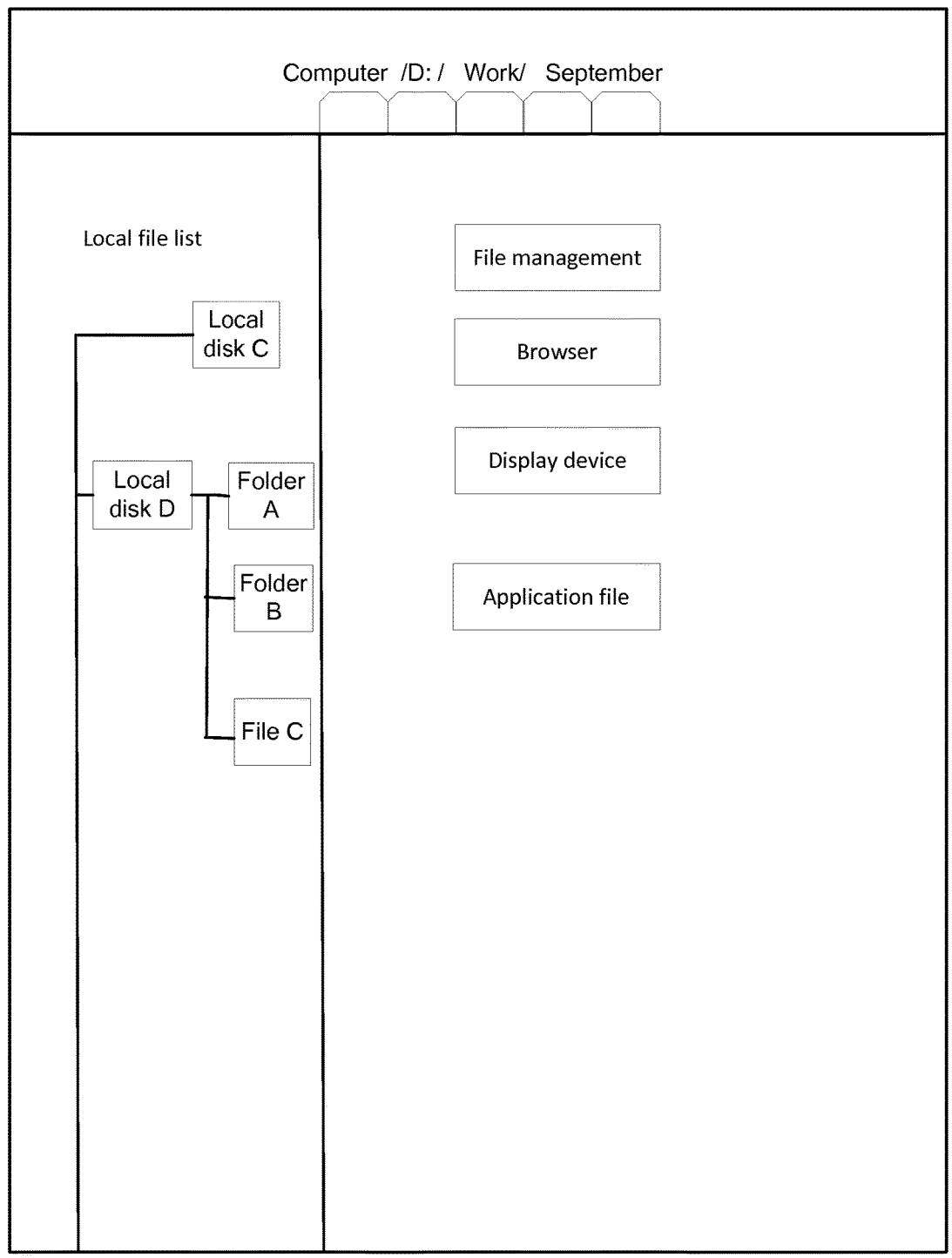
FIG. 9 shows a schematic diagram of a browser page showing a local file according to an embodiment of the invention.

When what is loaded and displayed in a browser page (also called a web window, a web page) is a local file, what is displayed by it in the address bar is a local path of the local file. FIG. 9 shows a schematic diagram of a browser page showing a local file according to an embodiment of the invention. In FIG. 9, a local file list is provided on the left side, content of a folder selected by a user is presented on the right side, and what is displayed in the address bar is the address (i.e., a local storage path) of a file.

The Tab mark therein may be differentiated from other web page to indicate the difference.

Figure 10:
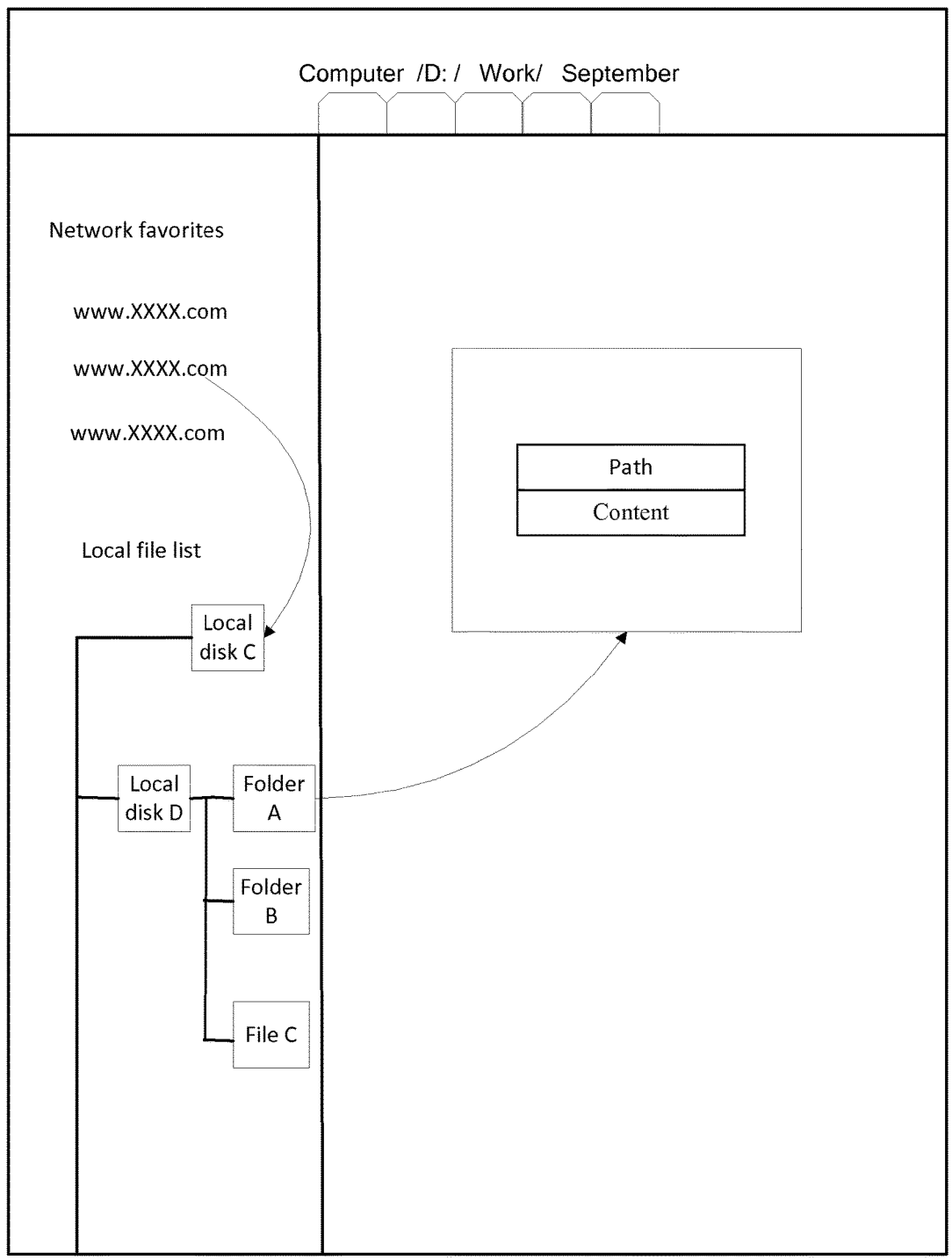
FIG. 10 shows a schematic diagram of an interface in which two kinds of file lists are displayed in a single frame according to an embodiment of the invention.
Figure 11:
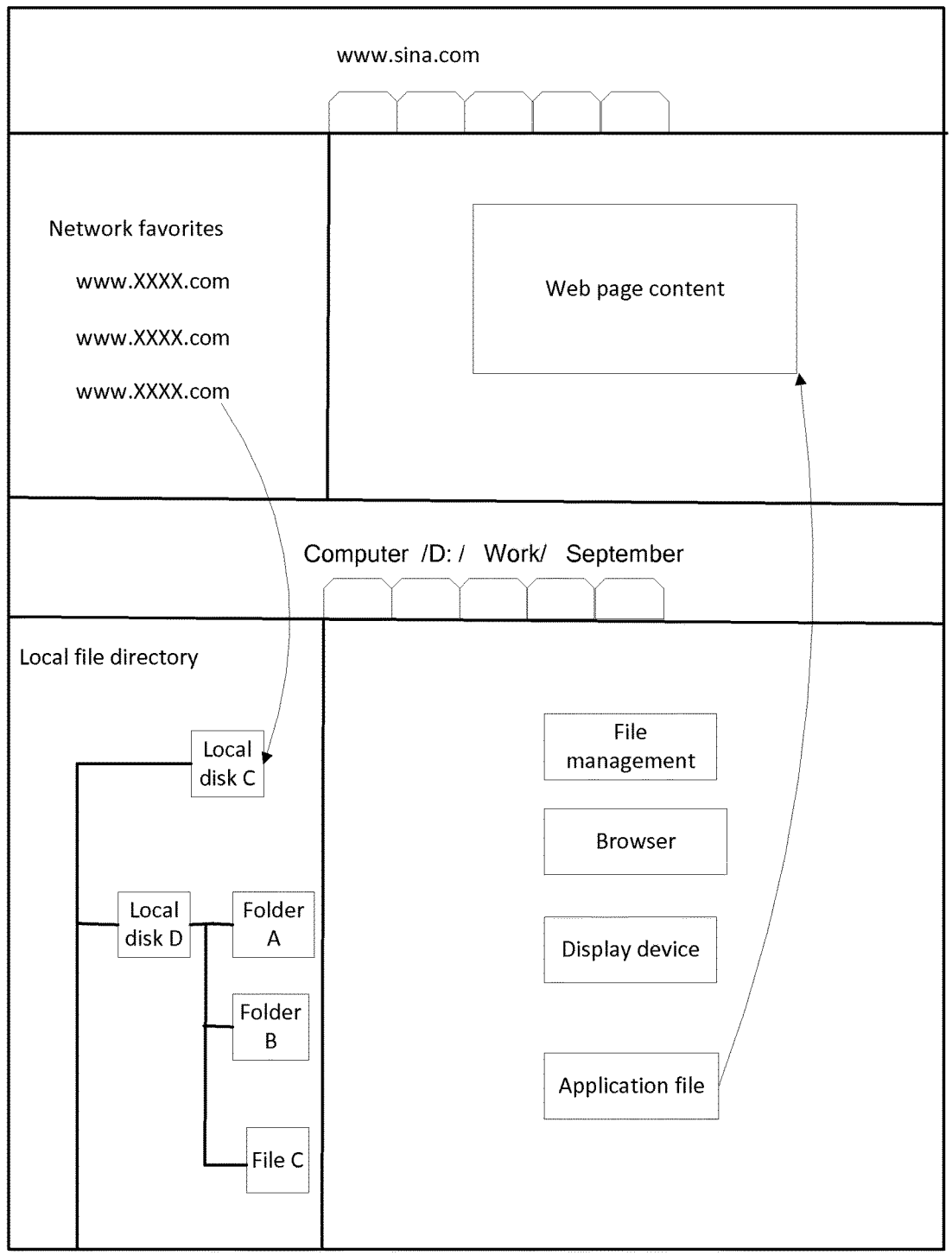
FIG. 11 shows a schematic diagram of an interface in which two kinds of file lists are displayed in two frames according to an embodiment of the invention.

In this embodiment, there are provided two kinds of interfaces. FIG. 10 shows a schematic diagram of an interface in which two kinds of file lists are displayed in a single frame according to an embodiment of the invention, whereas FIG. 11 shows a schematic diagram of an interface in which two kinds of file lists are displayed in two frames according to an embodiment of the invention.

Referring to FIG. 10, when it is needed to download a web resource (i.e., a network file) to the locality, a URL address in the address bar may be clicked with a mouse and dragged into a corresponding file in local resources displayed beneath favorites in the left bar. It may also be possible to click an item in the favorites or a web history and drag it into a corresponding file in local resources displayed beneath the favorites in the left bar.

When the user clicks a URL or an item corresponding to the URL, the browser obtains the corresponding URL, and can obtain content of the web page (including the title of the web page), and transmits the obtained content via streaming into a folder which it is dragged to, and the title of the file saved in the folder is just the title of the web page.

Still further, in the streaming procedure, the content of the web page may be first streamed into a temporary file, and if transmitted successfully, the content of the temporary file is then transmitted into a target folder, and if the procedure of first streaming the content of the web page into a temporary file does not succeed, a prompt is given or retransmission is performed. As such, the integrity of the transmission of content of a web page to a local file is ensured.

On the other hand, when it is needed to upload local content into web, a corresponding file in local resources displayed beneath favorites in the left bar may be clicked, and dragged into an input interface in a current web page.

When the user clicks a corresponding file in local resources displayed beneath favorites in the left bar, the browser may obtain the path of the file, and when the user drags the file into an input interface in a current web page, an option box is displayed in the interface to prompt the user whether to upload a path or content. If the user selects a path, the path is written into the input interface; and if the user selects content, the browser obtains content of a file under the path and writes the content into the input interface.

Referring to FIG. 11, to further facilitate interaction between web content and local content, the display interface of the browser is divided into two parts or more, one part is for web browsing, and one part is for displaying internal resources.

Thus, apart from that the above interactive operation between web content and a local file may be implemented, an interactive operation between web content and particular content of a local file may also be implemented:

When it is needed to download a web resource into a local file, the path of the target local file is input in the lower part for displaying local resources of the browser, thereby displaying content of the target local file. Then, a URL address (an item in favorites or a web history) in the address bar is clicked, and is dragged into the displayed target local file.

When the user clicks a URL or an item corresponding to the URL, the browser obtains the corresponding URL, and can obtain content of the web page, and transmits the obtained content via streaming into the particular location of a file which it is dragged to.

On the other hand, when it is needed to upload content in a local file into web, the path of the target local file is input in the lower part for displaying local resources of the browser, thereby displaying content of the target local file; a portion of the displayed target local file may be selected and dragged into an input interface of the current web page.

When the user selects a portion of the displayed target local file, the browser may obtain content of the portion of the file, and when the user drags the portion of the file into an input interface in the current web page, the content is written into the input interface.

In the above two schemes, it will be more convenient only with respect to upload/download of a file. It suffices to just select content to be interacted in a web/local page and copy and paste/drag it into the local/web page.

By employing the embodiment of the invention, the interactive operation between web content and local content can be simplified, the operation efficiency is improved, and local resources and web resources are integrated. In turn, the file resource manager and the web page browser are merged to provide the unified management of a web page and a file, the permissions for system operations are increased, and the inefficient interactivity between them is resolved.

Employing the data transmission method and device provided by embodiments of the invention, the following beneficial effects can be achieved:

In embodiments of the invention, parse is performed after a transmission instruction sent by a user is received, and thereby information of the data to be transmitted itself and the destination information are received. Subsequently, data transmission may be performed according to the destination of the data to be transmitted, and if the destination is a network side, the data may be transmitted to the network side; and if the destination is a local client, the data may be transmitted to the local client. Employing the data transmission method and device provided by embodiments of the invention, the transmission of data between the network side and the local client may be realized, the transmission way is simple and convenient, and the data transmission efficiency is improved.

It is mentioned in the related arts that the display of a local resource by the file resource manager is of a single interface, multiple presentation interfaces can not be reserved simultaneously, the switching operation of the user is inconvenient, and the operation efficiency is low.

To resolve the above technical problem, an embodiment of the invention provides a file display device which is configured for a browser supporting multi-page display. Since the browser supports multi-page display, the drawbacks of a single interface can be overcome, and at the same time multiple presentation interfaces be reserved, when the file display device is applied in the browser.

Figure 12:
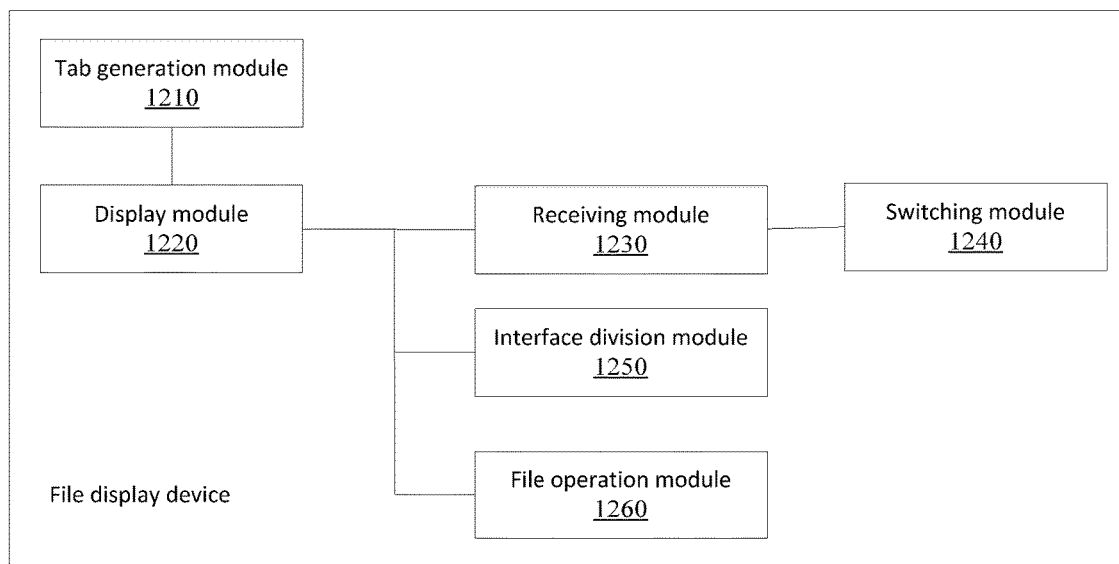
FIG. 12 shows a structural schematic diagram of a file display device according to an embodiment of the invention.

FIG. 12 shows a structural schematic diagram of a file display device according to an embodiment of the invention. Referring to FIG. 12, the file display device comprises a tab generation module 1210 and a display module 1220. Now, the structural components and functions of the file display device are described respectively.

First, the tab generation module 1210 is introduced. When a page is opened in a browser, the tab generation module 1210 will generate a corresponding tab according to content displayed by the page, wherein the significance of the tab is to differentiate between different pages. After the tab of a page is generated, the user may select a page to be opened and displayed according to the tab. Therein, the content displayed by the page in this example comprises not only a network file usually accessed by the browser, but also a local file.

Then, the display module 1220 is introduced. After the tab is generated, the display module 120 will display content of the page and a corresponding tab in an interface of the browser for each page.

That is, the file display device provided by the embodiment of the invention may open or display a local file and a network file in a browser simultaneously, and the browser integrates the function (displaying a local file) of a file resource manager and makes an improvement on its function at the same time, not only provides a single display interface for a local file, but also can display multiple local files in multiple pages simultaneously, and reserve multiple presentation pages. Moreover, the tab generation module in the embodiment of the invention generates a corresponding tab for each page, and when a user desires to switch to a different presentation page, he need only select a different tab, which improves the accuracy of the user's switching operation and increases the switching efficiency.

When implemented, the file display device may be separately implemented in a plug-in of the browser, or may also be implemented in another plug-in, for example, implemented in the plug-in of the favorites.

It is mentioned above that the content displayed by the page in this example comprises not only a network file usually accessed by the browser, but also a local file. Therefore, the tab generation module 1210 need generate a different type of tab for a different type of file, so that the user differentiates between different files according to tabs and in turn performs selection. In particular, if it is determined that the content displayed on a current page is a network file, the tab generation module 1210 generates a network tab for the page. Further, if it is determined that the content displayed on a current page is a local file, the tab generation module 1210 generates a local tab for the page.

In addition to the tab function played on their own, a network tab and a local tab may also be configured for differentiating between different types of files. Therefore, the appearances of a network tab and a local tab may be different. For example, the font of a network tab is presented in a general font, whereas the font of a local tab is presented in a highlighted font. For another example, network logos (e.g., @) are added in front of all the titles of network tabs, whereas local disk logos (e.g., C:\, D:\, E:) are added in front of all the titles of local tabs. For yet another example, the background color of a network tab is different from that of a local tab, and the like. The above are just several particular examples, there may be other distinguishing means when particularly implemented, and it suffices to differentiate between the two.

Figure 13:
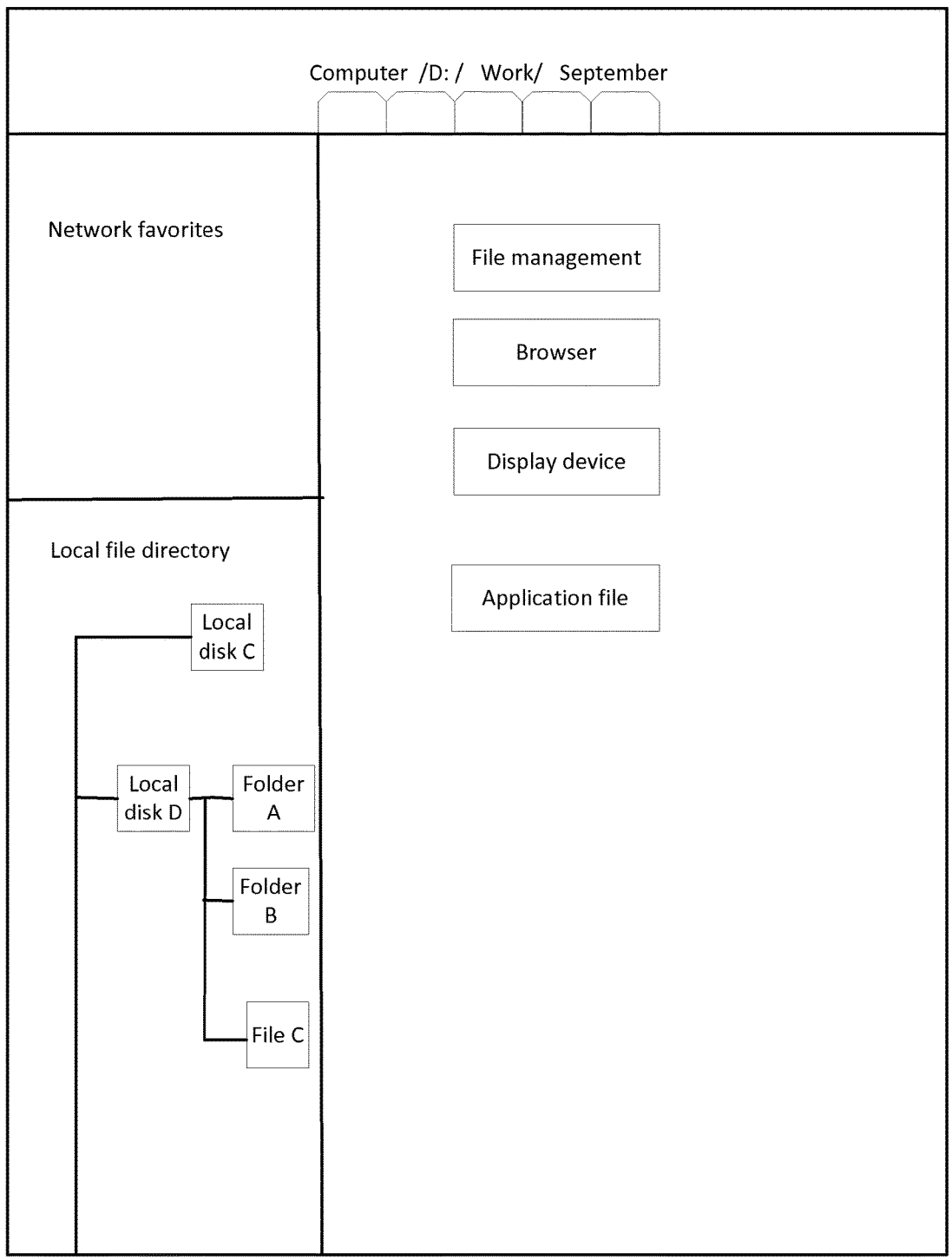
FIG. 13 shows a schematic diagram of local file switching according to an embodiment of the invention.

By employing the file display device provided by the embodiment of the invention, when a user opens multiple local files, the multiple local files will be displayed in pages represented by different tabs, and the user may conveniently switch a different local resource by clicking a different tab. FIG. 13 shows a schematic diagram of local file switching according to an embodiment of the invention.

Referring to FIG. 12, the file display device may further comprise a receiving module 1230 and a switching module 1240. When multiple pages are displayed, the user may select a page or content that he wants to browse through according to his own desire, and initiate a selection instruction with respect to the page or content that he wants to browse through. When multiple pages are displayed, there are multiple tabs in the browser, and the receiving module 1230 can receive the selection instruction of the user, parse the selection instruction, and select a tab among multiple tabs. Afterwards, the switching module 1240 may switch a displayed page on the browser interface from the current page to a page corresponding to the selected tab, according to the tab parsed out by the selection instruction.

Since there may be multiple types of content displayed on the browser interface by the file display device, for example, one classification is a network file and a local file, to differentiate different content, referring to FIG. 12, the file display device may further comprise an interface division module 1250 configured to divide an interface according to content displayed by the interface of the browser. The particular number of divided parts depends on a particular situation. For example, if there are only two kinds of files or the user need only browse through two kinds of files, it suffices to divide it into two parts at this point. The principles for three, four or even more kinds of files are similar.

Figure 14:
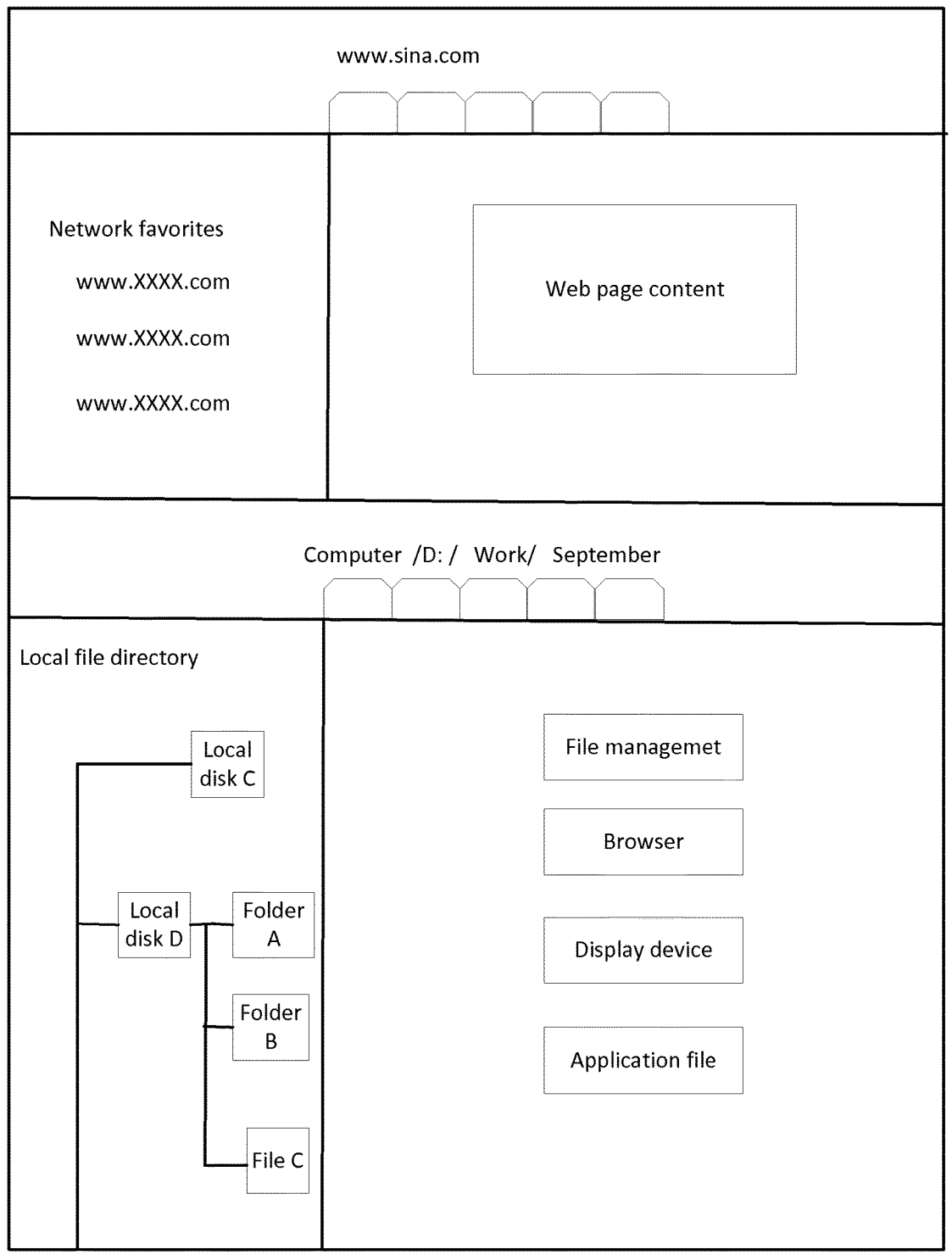
FIG. 14 shows another schematic diagram of interface division according to an embodiment of the invention.

For example, when an interface division is performed in terms of the difference between a network file and a local file, the interface division module 1250 divides a browser interface into a first part and a second part, wherein the first part displays a network file and the second part displays a local file. At this point, the display interface of the browser is divided into two large parts, one part is for web browsing (displaying a network file), and one part is for displaying an internal resource (displaying a local file). The display of the two parts presents content in the form of a tab. FIG. 13 further shows a schematic diagram of interface division. FIG. 14 shows another schematic diagram of interface division according to an embodiment of the invention. That is, the divided two parts may be merged together, or may also be completely independent of each other. The above two forms of presentation may be chosen by the user, and the sizes of the individual parts may be adjusted by the user.

The first part and the second part here are just for differentiating different areas, and do not have a sorting or other meaning, and in a real interface, the positions of the first part and the second part may be exchanged.

It is mentioned above that the file display device may access a local file, and further, the file display device may also operate a local file. Referring to FIG. 12, in the file display device a file operation module 1260 is further arranged. When the content displayed on the browser interface is a local file, the file operation module 1260 operates the local file on the browser interface.

For ways of a local file being opened, they may be divided into two kinds, one in which a developer has provided a plug-in, e.g., flash, and one in which the file can only be opened by a local program. For either kind, the solution is to store a configuration file (which may also be called a mapping list) in the locality, within which a mapping of opening ways for files with different suffixes is provided.

In particular, the file operation module 1260 may implement the operations of a local file according to the following steps. First, the file operation module 1260 identifies the suffix identification of the local file. Then, the file operation module 1260 queries in a preset mapping list about a plug-in which operates a local file of a type identified by the suffix, wherein in the mapping list a mapping relationship between suffix identifications and plug-ins is stored. Last, the file operation module 1260 utilizes the queried plug-in to operate the local file.

When the file display device is arranged in a browser and a file displayed in the browser is clicked, the browser will automatically judge the type of the file and invoke a matching plug-in and program for processing. The more the plug-ins, the stronger the ability of the browser to handle a file is.

When embodied, a plug-in is generally implemented by an individual work thread(s), and utilizing a plug-in to operate a local file is to operate the local file by its corresponding thread(s).

Therein, the mapping list may be stored locally, or may also be stored in a server where the browser can obtain information, e.g. a cloud server. Storing the mapping list in a cloud server may reduce the storage load of the local client or a fixed server and guarantee the availability of a space.

There are multiple kinds of operations of a local file by the file display device, which preferably comprise at least one of the following: opening the local file; editing the local file; deleting the local file; copying the local file; and moving the local file. The operations listed here are just some examples, and there are further comprised many particular operations, which depends on an actual situation.

The local file mentioned above may be any form of file, such as a text file, a picture file, a video file, an audio file, etc.

Figure 15:
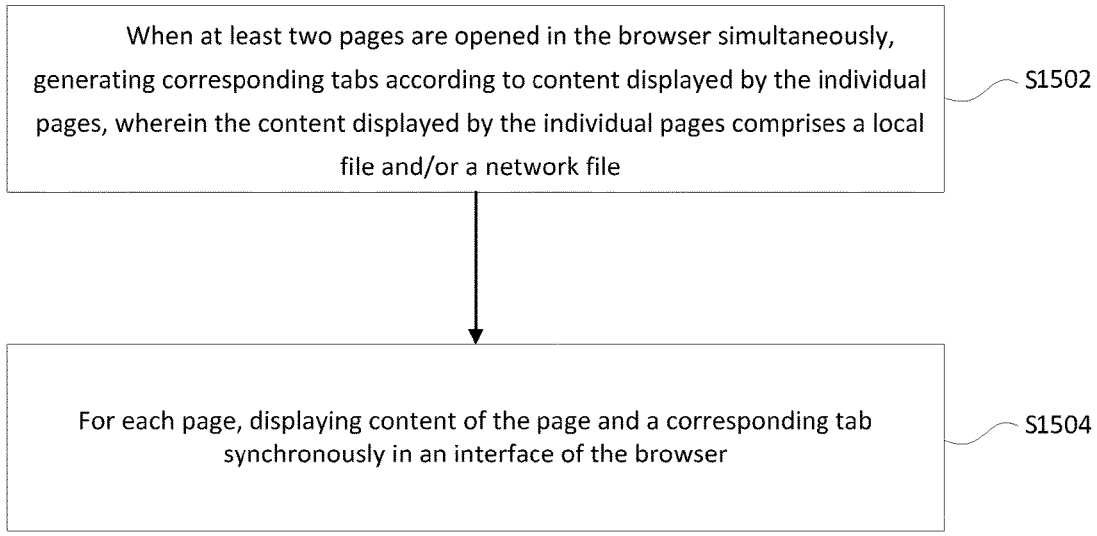
FIG. 15 shows a processing flow chart of a file display method according to an embodiment of the invention.

Based on one and the same inventive concept, an embodiment of the invention further provides a file display method configured for a browser supporting multi-page display. FIG. 15 shows a processing flow chart of a file display method according to an embodiment of the invention, which comprises step S1502 to step S1504.

At step S1502, when at least two pages are opened in the browser simultaneously, corresponding tabs are generated according to content displayed by the individual pages, wherein the content displayed by the individual pages comprises a local file and/or a network file.

At step S1504, for each page, content of the page and a corresponding tab are displayed synchronously in an interface of the browser.

When step S1502 is implemented, according to different content displayed on a page, the generated type of tab is also different, so that the user differentiates between different files according to tabs and in turn performs selection. If the content displayed on a current page is a network file, a network tab is generated for the page. Accordingly, if the content displayed on a current page is a local file, a local tab is generated for the page.

In addition to the tab function played on their own, a network tab and a local tab may also be configured for differentiating between different types of files. Therefore, the appearances of a network tab and a local tab may be different. For example, the font of a network tab is presented in a general font, whereas the font of a local tab is presented in a highlighted font. For another example, network logos (e.g., @) are added in front of all the titles of network tabs, whereas local disk logos (e.g., C:\, D:\, E:) are added in front of all the titles of local tabs. For yet another example, the background color of a network tab is different from that of a local tab, and the like. The above are just several particular examples, there may be other distinguishing means when particularly implemented, and it suffices to differentiate between the two.

By employing the file display method provided by the embodiment of the invention, when a user opens multiple local files, the multiple local files will be displayed in pages represented by different tabs, and the user may conveniently switch a different local resource by clicking a different tab.

When multiple pages are displayed, the user may select a page or content that he wants to browse through according to his own desire, and initiate a selection instruction with respect to the page or content that he wants to browse through. When multiple pages are displayed, there are multiple tabs in the browser, and after the selection instruction of the user is received, the selection instruction is parsed, and a tab is selected among multiple tabs. Afterwards, a displayed page on the browser interface may be switched from the current page to a page corresponding to the selected tab, according to the tab parsed out by the selection instruction.

Since there may be multiple types of content displayed on the browser interface by the file display device, for example, one classification is a network file and a local file, to differentiate different content, an interface may be divided according to content displayed by the interface of the browser. The particular number of divided parts depends on a particular situation. For example, if there are only two kinds of files or the user need only browse through two kinds of files, it suffices to divide it into two parts at this point. The principles for three, four or even more kinds of files are similar.

For example, when an interface division is performed in terms of the difference between a network file and a local file, a browser interface may be divided into a first part and a second part, wherein the first part displays a network file and the second part displays a local file. At this point, the display interface of the browser is divided into two large parts, one part is for web browsing (displaying a network file), and one part is for displaying an internal resource (displaying a local file). The display of the two parts presents content in the form of a tab. The first part and the second part here are just for differentiating different areas, and do not have a sorting or other meaning, and in a real interface, the positions of the first part and the second part may be exchanged.

Figure 16:
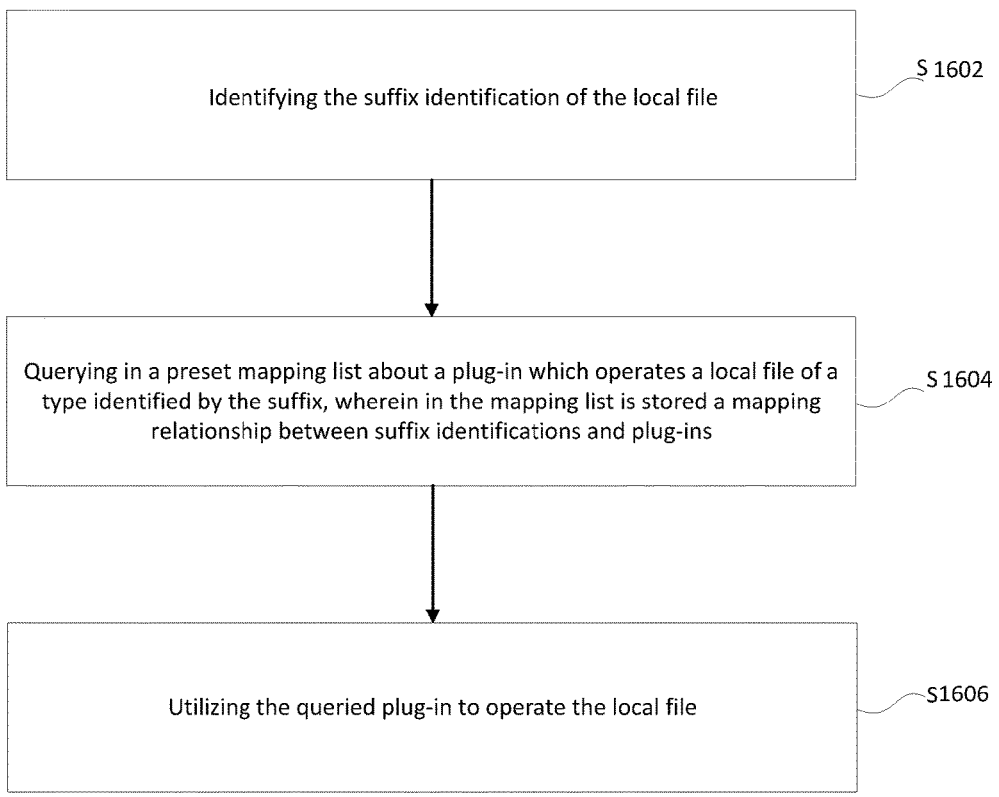
FIG. 16 shows a processing flow chart of operating a local file on a browser interface according to an embodiment of the invention.

When the content displayed on the browser interface is a local file, the local file may be operated on the browser interface. FIG. 16 shows a processing flow chart of operating a local file on a browser interface according to an embodiment of the invention, which comprises step S1602 to step S1606.

At step S1602, the suffix identification of the local file is identified. At step S1604, it is queried in a preset mapping list about a plug-in which operates a local file of a type identified by the suffix, wherein in the mapping list a mapping relationship between suffix identifications and plug-ins is stored. At step S1606, the queried plug-in is utilized to operate the local file.

When the file display device is arranged in a browser and a file displayed in the browser is clicked, the browser will automatically judge the type of the file and invoke a matching plug-in and program for processing. The more the plug-ins, the stronger the ability of the browser to handle a file is.

When embodied, a plug-in is generally implemented by an individual work thread(s), and utilizing a plug-in to operate a local file is to operate the local file by its corresponding thread(s).

Therein, the mapping list may be stored locally, or may also be stored in a server where the browser can obtain information, e.g. a cloud server. Storing the mapping list in a cloud server may reduce the storage load of the local client or a fixed server and guarantee the availability of a space.

There are multiple kinds of operations of a local file by the file display device, which preferably comprise at least one of the following: opening the local file; editing the local file; deleting the local file; copying the local file; and moving the local file.

The operations listed here are just some examples, and there are further comprised many particular operations, which depends on an actual situation.

The local file mentioned above may be any form of file, such as a text file, a picture file, a video, audio file, etc.

By employing the file display device and method provided by embodiments of the invention, combination of Web browsing and local file browsing can be realized, thereby further implementing a multi-interface exhibition of local content and operations of a local file in the browser, increasing the operation efficiency of a user switching local files, and realizing the integration of local resources with web resources.

By employing the file display device and method provided by embodiments of the invention, the following beneficial effects can be achieved:

The file display device provided by embodiments of the invention may open or display a local file and a network file in a browser simultaneously, and the browser integrates the function (displaying a local file) of a file resource manager and makes an improvement on its function at the same time, not only provides a single display interface for a local file, but also can display multiple local files in multiple pages simultaneously, and reserve multiple presentation pages. Moreover, the tab generation module in embodiments of the invention generates a corresponding tab for each page, and when a user desires to switch to a different presentation page, he need only select a different tab, which improves the accuracy of the user's switching operation and increases the switching efficiency.

Embodiments of the individual components of the invention may be implemented in hardware, or in a software module running on one or more processors, or in a combination thereof. It will be appreciated by those skilled in the art that, in practice, some or all of the functions of some or all of the components in a file management apparatus according to individual embodiments of the invention may be realized using a microprocessor or a digital signal processor (DSP). The invention may also be implemented as an apparatus or device program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 17:
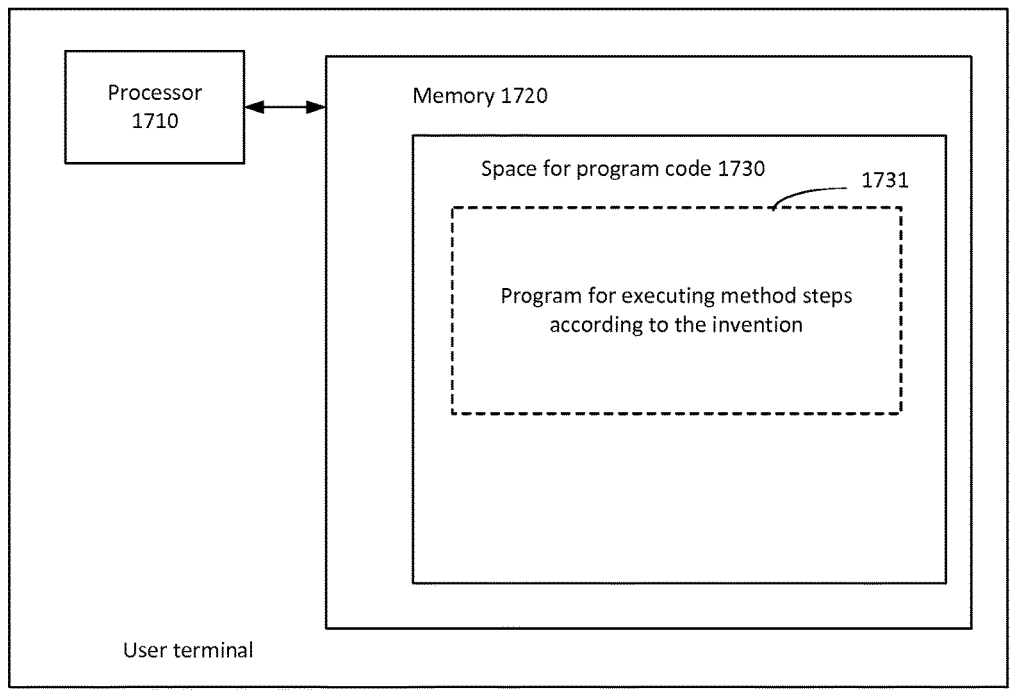
FIG. 17 shows schematically a block diagram of a user terminal for performing a method according to the invention.
Figure 18:
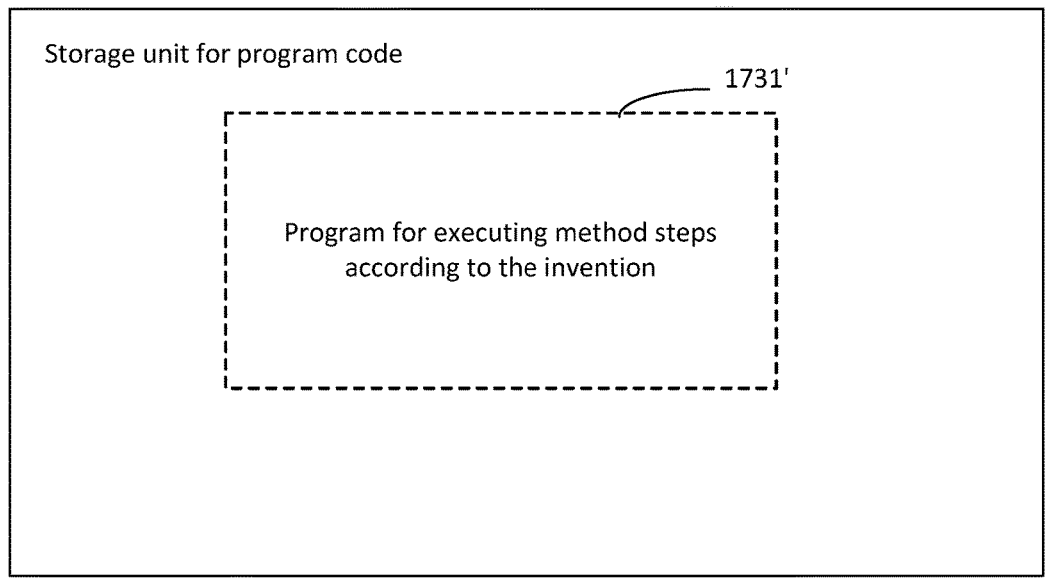
FIG. 18 shows schematically a storage unit for retaining or carrying a program code implementing a method according to the invention.

For example, FIG. 17 shows a user terminal which may carry out file management according to the invention, e.g., an application client. The user terminal traditionally comprises a processor 1710 and a computer program product or a computer readable medium in the form of a memory 1720. The memory 1720 may be an electronic memory such as a flash memory, an EEPROM (electrically erasable programmable read-only memory), an EPROM, a hard disk or a ROM. The memory 1720 has a memory space 1730 for a program code 1731 for carrying out any method steps in the methods as described above. For example, the memory space 1730 for a program code may comprise individual program codes 1731 for carrying out individual steps in the above methods, respectively. The program codes may be read out from or written to one or more computer program product. These computer program products comprise such a program code carrier as a hard disk, a compact disk (CD), a memory card or a floppy disk. Such a computer program product is generally a portable or stationary storage unit as described with reference to FIG. 18. The storage unit may have a memory segment, a memory space, etc. arranged similarly to the memory 1720 in the user terminal of FIG. 17. The program code may for example be compressed in an appropriate form. In general, the storage unit comprises a computer readable code 1731', i.e., a code which may be read by e.g., a processor such as 1710, and when run by a server, the codes cause the server to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

Embodiments of the invention disclose: A1: a data transmission device for bidirectional data transmission between a network side and a local client, comprising: an instruction receiver configured to receive a transmission instruction of a user; an instruction parser configured to parse out information of data to be transmitted and destination information according to the instruction; and a data transmitter configured to, according to the parsed out information of data to be transmitted and the destination information, obtain the data to be transmitted and transmit the data to be transmitted to the destination. A2: the device according to A1, wherein the information of data to be transmitted comprises at least one of the following: the address of the data to be transmitted; the type of the data to be transmitted; and the volume of the data to be transmitted. A3: the device according to A1 or A2, wherein the data to be transmitted comprises a file. A4: the device according to A3, wherein when a list of files at the network side and a list of files at the local client are displayed simultaneously on one and the same browser page, the instruction is to move on a page the logo of the file to be transmitted to the destination in a dragging way. A5: the device according to A4, wherein on the page, the data transmitter is further configured to, when the type of the file to be transmitted is a network file, select a network address of the file to be transmitted, and drag the network address into a list of files of the local client on the page; when the type of the file to be transmitted is a local file, select a local storage path of the file to be transmitted, and drag the local storage path into a list of files of the network side on the page. A6: the device according to A5, wherein the instruction parser is further configured to obtain the network address of the file to be transmitted by utilizing at least one of the following ways: obtaining it from the address bar of the browser; obtaining it from the network browsing history of the browser; and obtaining it from items stored in the favorites of the browser. A7: the device according to A5 or A6, wherein the data transmitter is further configured to obtain content of a web page corresponding to the network address in the browser; and transmit the content of the web page via streaming into a folder in the local client which the network address has been dragged to. A8: the device according to A7, wherein in a folder of the local client, the file storing the content of the web page employs a headline of the content of the web page as a file title. A9: the device according to A7 or A8, wherein the data transmitter is further configured to stream the content of the web page into a temporary file of the local client in the streaming procedure; and after the transmission is successful, re-stream the content of the web page from the temporary file into a folder corresponding to the destination. A10: the device according to A9, wherein the data transmitter is further configured to prompt a transmission failure or retransmission if the transmission failure appears in the streaming procedure. A11: the device according to any one of A5 to A10, wherein the data transmitter is further configured to obtain the local storage path in the browser; and obtain a file corresponding to the local storage path and upload information of the file according to the selection of the user. A12: the device according to A11, wherein the data transmitter is further configured to utilize a browser interface to prompt the user whether he selects to upload the local storage path of the file and/or the file content of the file; and upload the information of the file according to the selection of the user. A13: the device according to any one of A4 to A12, further comprising: a page setter configured to display a file list of the network side and a file list of the local client simultaneously in a frame of the browser; or arrange two standalone frames in the browser, one for displaying a file list of the network side, and the other for displaying a file list of the local client. A14: the device according to A13, wherein the data transmitter is further configured to copy the logo of the file to be transmitted on the page; and paste the copied logo to the destination.

Embodiments of the invention further discloses: B15: a data transmission method for bidirectional data transmission between a network side and a local client, comprising: receiving a transmission instruction of a user; parsing out information of data to be transmitted and destination information according to the instruction; and according to the parsed out information of data to be transmitted and the destination information, obtaining the data to be transmitted and transmitting the data to be transmitted to the destination. B16: the method according to B15, wherein the information of data to be transmitted comprises at least one of the following: the address of the data to be transmitted; the type of the data to be transmitted; and the volume of the data to be transmitted. B17: the method according to B15 or B16, wherein the data to be transmitted comprises a file. B18: the method according to B17, wherein when a list of files at the network side and a list of files at the local client are displayed simultaneously on one and the same browser page, the instruction is to move on a page the logo of the file to be transmitted to the destination in a dragging way. B19: the method according to B18, wherein moving on a page the logo of the file to be transmitted to the destination in a dragging way comprises: when the type of the file to be transmitted is a network file, selecting a network address of the file to be transmitted, and dragging the network address into a list of files of the local client on the page; when the type of the file to be transmitted is a local file, selecting a local storage path of the file to be transmitted, and dragging the local storage path into a list of files of the network side on the page. B20: the method according to B19, wherein the ways of obtaining a network address of the file to be transmitted comprise at least one of the following: obtaining it from the address bar of the browser; obtaining it from the network browsing history of the browser; and obtaining it from items stored in the favorites of the browser. B21: the method according to B19 or B20, wherein after dragging the network address into a list of files of the local client on the page, there is comprised: obtaining content of a web page corresponding to the network address in the browser; and transmitting the content of the web page via streaming into a folder in the local client which the network address has been dragged to. B22: the method according to B21, wherein in a folder of the local client, the file storing the content of the web page employs a headline of the content of the web page as a file title. B23: the method according to B21 or B22, wherein the content of the web page is streamed into a temporary file of the local client in the streaming procedure; and after the transmission is successful, the content of the web page is re-streamed from the temporary file into a folder corresponding to the destination. B24: the method according to B23, wherein a transmission failure or retransmission is prompted if the transmission failure appears in the streaming procedure. B25: the method according to any one of B19 to B24, wherein after dragging the local storage path into a list of files of the network side on the page, there is comprised: obtaining the local storage path in the browser; and obtaining a file corresponding to the local storage path and uploading information of the file according to the selection of the user. B26: the method according to B25, wherein the uploading information of the file according to the selection of the user comprises: utilizing a browser interface to prompt the user whether he selects to upload the local storage path of the file and/or the file content of the file; and uploading the information of the file according to the selection of the user. B27: the method according to any one of B18 to B26, wherein displaying a list of files at the network side and a list of files at the local client simultaneously on one and the same browser page comprises: displaying a file list of the network side and a file list of the local client simultaneously in a frame of the browser; or arranging two standalone frames in the browser, one for displaying a file list of the network side, and the other for displaying a file list of the local client. B28: the method according to B27, wherein when arranging two standalone frames in the browser, transmitting the file to be transmitted to the destination comprises: copying the logo of the file to be transmitted on the page; and pasting the copied logo to the destination.

Embodiments according to the invention further disclose: C1: a file display device for a browser supporting multi-page display, comprising: a tab generation module configured to, when a page is opened in the browser, generate a corresponding tab according to content displayed by the page, wherein the content displayed by the page comprises a local file and/or a network file; and a display module configured to, for each page, display content of the page and a corresponding tab in an interface of the browser. C2: the device according to C1, wherein the tab generation module is further configured to, if the content displayed on a current page is a network file, generate a network tab for the page; and if the content displayed on a current page is a local file, generate a local tab for the page. C3: the device according to C2, wherein the appearances of the network tab and the local tab are different. C4: the device according to any one of C1 to C3, further comprising: a receiving module configured to receive a selection instruction of the user when there are multiple tabs in the browser simultaneously, wherein the selection instruction is used for selecting a tab; and a switching module configured to switch a page displayed on the browser interface from the current page to a page corresponding to the selected tab, according to the selection instruction. C5: the device according to any one of C1 to C4, further comprising: an interface division module configured to divide an interface according to content displayed by the browser interface. C6: the device according to C5, wherein the interface division module is further configured to divide the browser interface into a first part and a second part, wherein the first part displays a network file and the second part displays a local file. C7: the device according to any one of C1 to C6, further comprising: a file operation module configured to, when the content displayed on the browser interface is a local file, operate the local file on the browser interface. C8: the device according to C7, wherein the file operation module is further configured to identify the suffix identification of the local file; query in a preset mapping list about a plug-in which operates a local file of a type identified by the suffix, wherein in the mapping list a mapping relationship between suffix identifications and plug-ins is stored; and utilize the queried plug-in to operate the local file. C9: the device according to C8, wherein the mapping list is stored locally, or in a server where the browser can obtain information. C10: the device according to any one of C7 to C9, wherein the operations comprise at least one of the following: opening the local file; editing the local file; deleting the local file; copying the local file; and moving the local file.

Embodiments according to the invention further disclose: D11: a file display method for a browser supporting multi-page display, comprising: when at least two pages are opened in the browser simultaneously, generating corresponding tabs according to content displayed by the individual pages, wherein the content displayed by the individual pages comprises a local file and/or a network file; and for each page, displaying content of the page and a corresponding tab synchronously in an interface of the browser. D12: the method according to D11, wherein the generating corresponding tabs according to content displayed by the individual pages comprises: if the content displayed on a current page is a network file, generating a network tab for the page; and if the content displayed on a current page is a local file, generating a local tab for the page. D13: the method according to D12, wherein the appearances of the network tab and the local tab are different. D14: the method according to any one of D11 to D13, wherein after displaying content of the page and a corresponding tab synchronously in an interface of the browser, there is further comprised: receiving a selection instruction of the user when there are multiple tabs in the browser simultaneously, wherein the selection instruction is used for selecting a tab; and switch a page displayed on the browser interface from the current page to a page corresponding to the selected tab, according to the selection instruction. D15: the method according to any one of D11 to D14, further comprising: dividing an interface according to content displayed by the browser interface. D16: the method according to D15, wherein the dividing an interface according to content displayed by the browser interface comprises: dividing the browser interface into a first part and a second part, wherein the first part displays a network file and the second part displays a local file. D17: the method according to any one of D11 to D16, wherein when the content displayed on the browser interface is a local file, operating the local file on the browser interface. D18: the method according to D17, wherein operating the local file on the browser interface comprises: identifying the suffix identification of the local file; querying in a preset mapping list about a plug-in which operates a local file of a type identified by the suffix, wherein in the mapping list a mapping relationship between suffix identifications and plug-ins is stored; and utilizing the queried plug-in to operate the local file. D19: the method according to D18, wherein the mapping list is stored locally, or in a server where the browser can obtain information. D20: the method according to any one of D17 to D19, wherein the operations comprise at least one of the following: opening the local file; editing the local file; deleting the local file; copying the local file; and moving the local file.

The invention claimed is:

1. A file management method comprising:
    receiving, by at least one processor, an instruction input by a user, and determining a type of an object corresponding to the instruction;
    loading, by the at least one processor, a corresponding browser window according to the determined type of the object; and
    displaying, by the at least one processor, content of the object in the browser window;
    wherein the determining the type of the object corresponding to the instruction comprises:
    obtaining the object corresponding to the instruction;
    determining whether the type of the obtained object is a local path, and if the type of the object is the local path, determining that the object is a local object;
    when the object is the local object,
    the loading the corresponding browser window according to the determined type of the object comprises:
    loading a local browser window; and
    the displaying content of the object in the browser window comprises:
    finding a corresponding local file according to the local path; and
    displaying the found local file in the local browser window,
    wherein the displaying the found local file in the local browser window comprises:
    when the local file is a folder, displaying information on a folder(s) and a file(s) contained in the folder in a tree structure in the local browser window, wherein an individual folder acts as a node of the tree structure; and
    when the local file is a single file, displaying content of the single file in the local browser window on a web page.

2. The method according to claim 1, wherein the determining the type of the object corresponding to the instruction further comprises:
    determining whether the type of the object is a uniform resource locator (URL), and if the type of the object is the URL, determining that the object is a network object.

3. The method according to claim 2, wherein when the object is the network object,
    the loading the corresponding browser window according to the determined type of the object comprises:
    loading a network browser window; and
    the displaying content of the object in the browser window comprises: displaying content of a corresponding web page in the network browser window.

4. The method according to claim 1, wherein when at least two pages are opened in the browser simultaneously, generating corresponding tabs according to content displayed by the individual pages, wherein the content displayed by the individual pages comprises the local file and/or a network file; and for each page, displaying content of the page and a corresponding tab synchronously in an interface of the browser.

5. The method according to claim 4, wherein the generating corresponding tabs according to content displayed by the individual pages comprises: if the content displayed on the current page is the network file, generating a network tab for the page; and if the content displayed on the current page is the local file, generating a local tab for the page.

6. The method according to claim 4, wherein after displaying content of the page and the corresponding tab synchronously in the interface of the browser, the method further comprising: receiving a selection instruction of the user when there are multiple tabs in the browser simultaneously, wherein the selection instruction is used for selecting a tab; and switching a page displayed on the browser interface from the current page to a page corresponding to the selected tab, according to the selection instruction.

7. The method according to claim 4, further comprising: dividing the interface according to content displayed by the browser interface, wherein the dividing the interface according to content displayed by the browser interface comprises: dividing the browser interface into a first part and a second part, wherein the first part displays the network file and the second part displays the local file.

8. A file management device comprising:
   a memory having instructions stored thereon;
   a processor to execute the instructions to perform operations, the operations comprising:
   receiving an instruction input by a user, and determining a type of an object corresponding to the instruction;
   loading a corresponding browser window according to the determined type of the object; and
   displaying content of the object in the browser window;
   wherein the determining the type of the object corresponding to the instruction comprises:
   obtaining the object corresponding to the instruction;
   determining whether the type of the obtained object is a local path, and if the type of the object is the local path, determining that the object is a local object;
   when the object is the local object,
   the loading the corresponding browser window according to the determined type of the object comprises:
   loading a local browser window; and
   the displaying content of the object in the browser window comprises:
   finding a corresponding local file according to the local path; and
   displaying the found local file in the local browser window
   wherein the displaying the found local file in the local browser window comprises:
   when the local file is a folder, displaying information on a folder(s) and a file(s) contained in the folder in a tree structure in the local browser window, wherein an individual folder acts as a node of the tree structure; and
   when the local file is a single file, displaying content of the single file in the local browser window on a web page.

9. The device according to claim 8, wherein the determining the type of the object corresponding to the instruction further comprises:
   determining whether the type of the object is a uniform resource locator (URL), and if the type of the object is the URL, determining that the object is a network object.

10. The device according to claim 9, wherein when the object is the network object:
    the loading the corresponding browser window according to the determined type of the object comprises loading a network browser window; and
    the displaying content of the object in the browser window comprises displaying content of a corresponding web page in the network browser window.

11. The device according to claim 8, wherein in the browser window, different tabs are utilized to point to different display contents, and the operations further comprising:
    when content of an object queried most recently by the user is pointed to according to a new tab, utilizing an already displayed tab to point to previously displayed object content, wherein the new tab and the already displayed tab are displayed simultaneously in the browser window.

12. The device according to claim 8, the operations further comprising: displaying a history of local files in the browser window.

13. A non-transitory computer readable medium having instructions stored thereon that, when executed by at least one processor, cause the at least one processor to perform operations comprising:
    receiving an instruction input by a user, and determining a type of an object corresponding to the instruction;
    loading a corresponding browser window according to the determined type of the object; and
    displaying content of the object in the browser window;
    wherein the determining the type of the object corresponding to the instruction comprises:
    obtaining the object corresponding to the instruction;
    determining whether the type of the obtained object is a local path, and if the type of the object is the local path, determining that the object is a local object;
    when the object is the local object,
    the loading the corresponding browser window according to the determined type of the object comprises:
    loading a local browser window; and
    the displaying content of the object in the browser window comprises:
    finding a corresponding local file according to the local path; and
    displaying the found local file in the local browser window,
    wherein the displaying the found local file in the local browser window comprises:
    when the local file is a folder, displaying information on a folder(s) and a file(s) contained in the folder in a tree structure in the local browser window, wherein an individual folder acts as a node of the tree structure; and
    when the local file is a single file, displaying content of the single file in the local browser window on a web page.

* * * * *